United States Patent [19]

Choquier et al.

[11] Patent Number: 5,774,668
[45] Date of Patent: Jun. 30, 1998

[54] SYSTEM FOR ON-LINE SERVICE IN WHICH GATEWAY COMPUTER USES SERVICE MAP WHICH INCLUDES LOADING CONDITION OF SERVERS BROADCASTED BY APPLICATION SERVERS FOR LOAD BALANCING

[75] Inventors: Philippe Choquier, Paris, France; Jean-Francios Peyroux, Bellevue; William J. Griffin, Bothell, both of Wash.

[73] Assignee: Microsoft Corporation, Redmond, Wash.

[21] Appl. No.: 472,807

[22] Filed: Jun. 7, 1995

[51] Int. Cl.$^6$ .................................................. G06F 13/14
[52] U.S. Cl. ............................... 395/200.53; 395/200.33; 395/200.37; 395/200.53; 395/200.57; 395/200.48; 395/200.79; 395/675; 364/238; 364/281; 370/480
[58] Field of Search ..................................... 395/187, 200, 395/650, 307, 200.53, 200.33, 200.37, 200.57, 200.48, 200.79, 675; 370/85, 480; 364/238, 281

[56] References Cited

U.S. PATENT DOCUMENTS

| 4,799,156 | 1/1989 | Shavit et al. ........................ 364/401 R |
| 5,079,765 | 1/1992 | Nakamura ............................... 370/401 |
| 5,257,369 | 10/1993 | Skeen et al. ............................. 395/680 |
| 5,291,597 | 3/1994 | Shorter et al. ........................... 395/650 |
| 5,329,619 | 7/1994 | Page et al. ............................... 395/200 |
| 5,341,477 | 8/1994 | Pitkin et al. ............................. 395/200 |
| 5,347,632 | 9/1994 | Filepp et al. ...................... 395/200.09 |
| 5,423,003 | 6/1995 | Berteau ................................... 395/200 |
| 5,444,848 | 8/1995 | Johnson, Jr. et al. ............. 395/200.15 |
| 5,463,625 | 10/1995 | Yasrebi ..................................... 370/85 |
| 5,475,819 | 12/1995 | Miller et al. ....................... 395/200.03 |
| 5,491,800 | 2/1996 | Goldsmith et al. ............... 395/200.12 |
| 5,515,508 | 5/1996 | Pettus et al. ....................... 395/200.01 |
| 5,544,327 | 8/1996 | Dan et al. .......................... 395/200.64 |
| 5,548,724 | 8/1996 | Akizawa et al. .................. 395/200.03 |
| 5,548,726 | 8/1996 | Pettus ................................ 395/200.09 |
| 5,553,239 | 9/1996 | Heath et al. ....................... 395/187.01 |
| 5,559,969 | 9/1996 | Jennings .................................. 395/307 |
| 5,650,994 | 7/1997 | Daley ..................................... 370/259 |

Primary Examiner—Thomas C. Lee
Assistant Examiner—Ki S. Kim
Attorney, Agent, or Firm—Leydig, Voit & Mayer, Ltd.

[57] ABSTRACT

An on-line services network includes application servers and Gateway microcomputers that are interconnected by a LAN. The Gateway microcomputers receive service requests which are transmitted over a WAN from client microcomputers operated by end users. Upon receiving a request to open a service, the Gateway microcomputers access a periodically-updated service map to locate the replicated application servers that are currently running the corresponding service application, and then apply a load balancing method (using server load data contained within the service map) to select an application server that has a relatively low processing load. A communications protocol between the client and Gateway microcomputers enables users to access multiple services simultaneously. A hot redirection technique allows a user service session to be transferred from one application server to another (replicated) application server without termination of the service session. Various mechanisms are provided for efficiently reallocating application servers to different on-line services, and for allowing additional servers to be efficiently added to the network.

59 Claims, 14 Drawing Sheets

SYSTEM FOR ON-LINE SERVICE IN WHICH GATEWAY COMPUTER USES SERVICE MAP WHICH INCLUDES LOADING CONDITION OF SERVERS BROADCASTED BY APPLICATION SERVERS FOR LOAD BALANCING

FIELD OF THE INVENTION

The present invention relates to computer networks. More particularly, the present invention relates to large-scale computer networks for providing information-related services and communications services to end users.

BACKGROUND

Various on-line services networks are currently in existence, including Compuserve, Prodigy, and America On-Line. End users typically access these networks using a microcomputer equipped with a modem. During a logon session, a user can use a variety of information-related services and communications services, including news services, weather services, bulletin board services, email, and the like.

Existing architectures for on-line services networks suffer from a number of limitations. For example, existing on-line services networks do not provide an adequate means for allocating processing resources to user service requests, and thus do not make efficient use of available processing resources. Additionally, many existing on-line services networks do not provide a means for updating service applications without temporarily taking services off-line. Further, existing on-line services networks are not capable of allowing a user to access multiple services at a time.

It is an object of the invention to provide an on-line services network architecture which overcomes these and other limitations of the prior art.

SUMMARY OF THE PREFERRED EMBODIMENTS

In accordance with the present invention a client-server architecture for an on-line services network is provided in which on-line services are distributed and replicated on groups of application servers. The on-line services are implemented as client-server applications, with server portions (or "server applications") running on the application servers, and with client portions (or "client applications") running on client microcomputers of end users. The architecture features a high degree of scalability, allowing the capacity of the network to be scaled (without degradation of on-line services) as the number of end users increases over time. The architecture also features various mechanisms for dynamically balancing the processing load among the application servers of the system. The architecture also features various mechanisms for dynamically allocating processing resources (such as application servers) to specific on-line services, so that fluctuations in usage levels of specific on-line services can be efficiently accommodated. The architecture additionally features a transport mechanism that allows end users to simultaneously access multiple on-line services. The architecture further permits service applications to be updated without temporarily taking the services off-line.

In a preferred embodiment, the application servers of the system are interconnected by a local area network, and are arranged into service groups, with each service group corresponding to a particular service. Each application server of a service group is preferably a "replicated" version of the other application servers within the service group, meaning that each runs the same server application (or server applications) as the others to implement a common service. For example, application servers within a bulletin board system ("BBS") service group all run a BBS server application. Depending upon the particular service, each application server of the service group may locally store a replicated copy of the service's content. For example, all application servers within the BBS service group preferably store identical copies of all BBS messages. A service group may have as few as one application server. Further, a given server can handle multiple services, and can thus be simultaneously allocated to multiple service groups.

Users of a service are assigned to individual application servers on a per-service session basis. For example, when an end user initially opens the BBS service, the user's BBS service session will be assigned to one of the replicated application servers of the BBS service group, and that application server will normally service the end user until the BBS service session is terminated.

Multiple Gateway microcomputers are also connected to the local area network. Each Gateway microcomputer is connected to a wide area network for communicating with client microcomputers of end users. The wide area network preferably uses CCITT X.25, and may additionally or alternatively use other standards such as TCP/IP, Frame Relay, or Asynchronous Transfer Mode (ATM). The Gateway microcomputers serve as intermediaries between the client microcomputers and the application servers. When a user initially logs onto the network, a connection is established between the client microcomputer and a Gateway microcomputer, and the connection is maintained throughout the logon session. During the logon session, the user typically opens and closes multiple services, and thus communicates with multiple application servers. The Gateway microcomputer assigned to the logon session maintains the various client-server message streams by routing service requests (from the client microcomputer) to the appropriate application servers, and by returning application server responses to the client microcomputer. In the preferred embodiment, each Gateway microcomputer can handle approximately 1000 simultaneous logon sessions.

In accordance with a dynamic load balancing feature of the invention, when a user sends a request to open a service, the Gateway microcomputer that receives the request initially identifies the application servers that are within the relevant service group. The Gateway microcomputer then determines the current load of each application server in the service group, and applies a load balancing method to select an application server that is relatively lightly loaded. The service request is then passed to the selected application server for processing.

In the preferred embodiment, the Gateway microcomputers identify the application servers in the service groups and determine the loads of the application servers by accessing a locally-stored service map. The service map contains information about every application server of the system. For example, for each application server, the service map indicates the names of the server applications running on the application server, the current processing load of the application server, and the overall processing power (in the form of a static CPU INDEX benchmark) of the application server. The service map is updated on the order of every 30 seconds to reflect changes in application server loads, and to reflect various changes in the system configuration.

Load balancing is preferably performed according to the specific dynamics of the individual services. One load balancing method uses the load and CPU INDEX values contained in the service map to calculate the available CPU processing power for each application server in the relevant service group, and then passes the service request to the application server having the greatest available CPU processing power. Another load balancing method selects application servers such that the probability of selection of a given application server is proportional to that application server's available CPU processing power.

In accordance with another feature of the invention, a transport protocol that handles client-Gateway communications over the local area network multiplexes client-server message streams to permit end users to access multiple services simultaneously. Using this feature, a user can, for example, access one service while downloading a large file from another service. Multiplexing is preferably performed by combining variable-length segments of different message streams within wide area network packets, wherein each message stream corresponds to a different service. To accommodate for differing throughput requirements of different services, lengths of the variable-length segments are varied on a service-by-service basis according to predetermined (or user specified) priority levels. Different amounts of wide area network bandwidth are thereby allocated to different services.

In accordance with another feature of the invention, application servers may be dynamically allocated to services (or equivalently, to service groups) to accommodate for fluctuations in usage levels of different services. To allocate an application server to a particular service, the server application (or applications) that implement the service are dynamically loaded (i.e., loaded without stopping the underlying process) on the application server. Likewise, to remove an application server from a service group, the relevant server applications are dynamically unloaded. In the preferred embodiment, dynamic link libraries for every server application reside on the hard disks of every application server, so that any service can be activated on any application server at virtually any time. Allocation of application servers to service groups can be performed semi-automatically by a system operator who monitors service loads from a system console, or automatically using a load monitoring program that compares service loads to predetermined thresholds.

In accordance with yet another feature of the invention, a user service session can be transferred from one application server to another application server (which runs the same service application), without termination or interruption of the service session. Application servers can thus be taken off line (for maintenance, or for reallocation to another service group, for example) without interfering with the end user's immediate use of the on-line service.

BRIEF DESCRIPTION OF THE DRAWINGS

These and other features of the invention will now be described with reference to the drawings of certain preferred embodiments, which are intended to illustrate and not to limit the invention, and in which.

Figure 1:
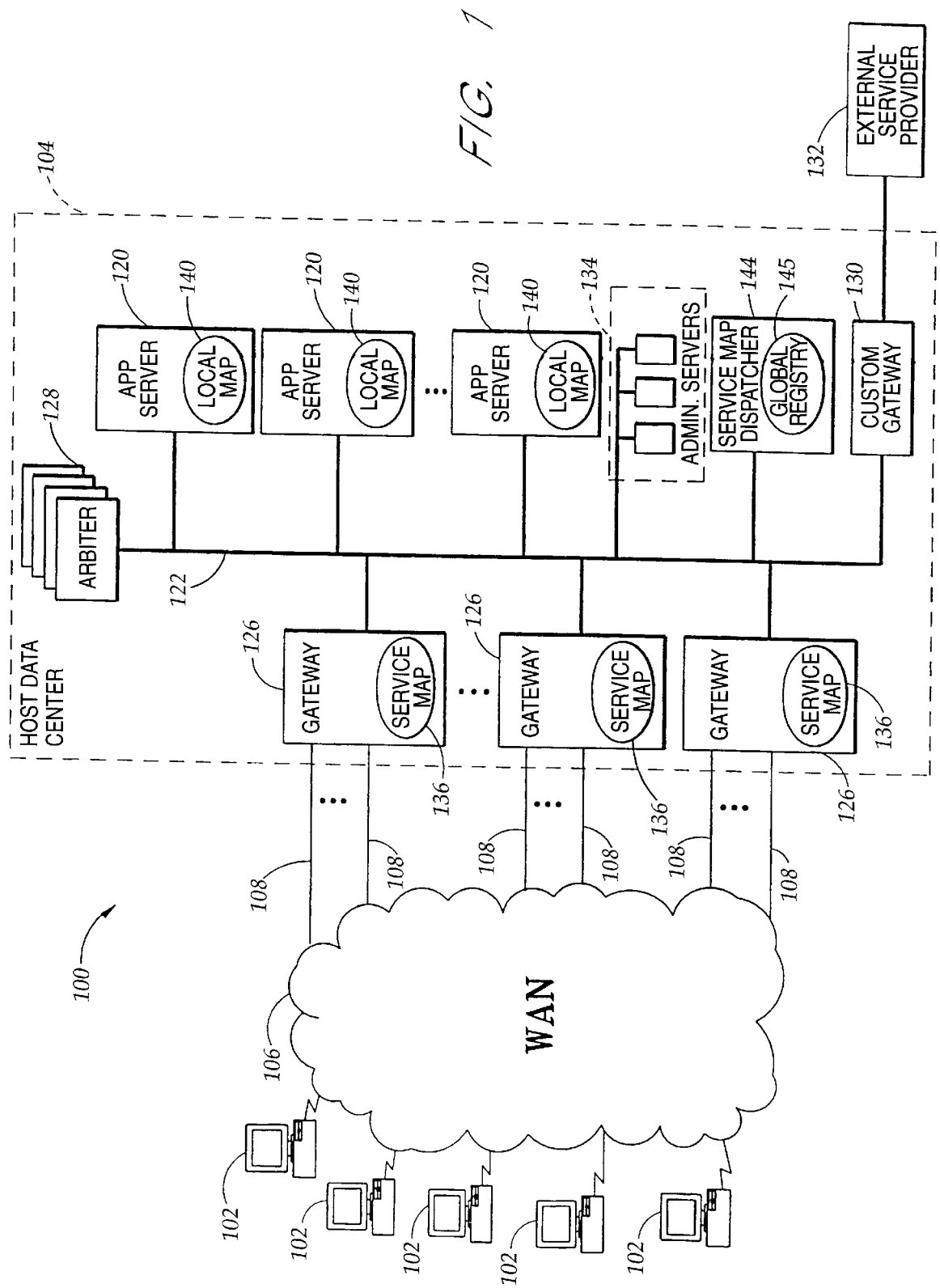
FIG. 1 is a high level diagram illustrating the architecture of an on-line services network in accordance with one embodiment of the invention.

Reference numbers in the drawings have three or more digits. The two least significant digits are reference numbers within the drawing, and the more significant digits are the figure number. For example, reference number 306 refers to an item first shown in FIG. 3.

DETAILED DESCRIPTION OF THE PREFERRED EMBODIMENTS

Described herein is a distributed, client-server architecture which employs replicated application servers to provide services to end users. Although the architecture is described in the context of an on-line services network, it will be recognized that various aspects and features of the architecture are applicable to other types of distributed systems.

For convenience, the description is broken up into the following ten sections: ARCHITECTURAL OVERVIEW; SERVICE GROUPS; SERVICE MAP; COMMUNICATIONS COMPONENTS; DYNAMIC LOAD BALANCING BY ROUTING OF SERVICE REQUESTS; SOFTWARE IMPLEMENTATION OF SERVICES ON SERVERS; CLIENT-GATEWAY COMMUNICATIONS; ARBITER; DYNAMIC ALLOCATION OF SERVERS TO SERVICE GROUPS; and SCALABILITY.

1. Architectural Overview

FIG. 1 is a high level diagram illustrating the basic components of an on-line services network 100 in accordance with one embodiment of the invention. Multiple client microcomputers 102 are connected to a host data center 104 by a wide area network (WAN) 106. The wide area network 106 includes WAN lines 108 which are provided by one or more telecommunications providers, and which allow end users (i.e., users the microcomputers 102) over a wide geographic area to access the host data center 104 via modem. The WAN lines 108 preferably include both X.25 lines and ISDN (Integrated Service Digital Network) lines. The X.25 lines 108 comply with the X.25 specification of the Comité Consultatif Internaionale de Télégraphie et Télé- phonie (CCITT)—an international standards organization in Geneva, Switzerland that recommends communications standards. The X.25 standard documents the interface required to connect a computer to a packet-switched network. In addition to or in place of X.25, the wide area network 106 may use other types of communications standards, such as Frame Relay, or the Transport Control Protocol/Internet Protocol ("TCP/IP"—a suite of protocols developed for use on the Internet).

The host data center 104 comprises a plurality of application servers (APP servers) 120 connected to a high speed local area network (LAN) 122 (which may include multiple LANs, as described below). Each application server 120 has a unique server ID. Also connected to the LAN 122 are multiple Gateway microcomputers 126 (hereinafter "Gateways"), which link incoming calls from end users to the application servers 120. In the preferred embodiment, the application servers 120 and the Gateways 126 are Pentium-class (or better) microcomputers which are scalable to at least four central processing units (CPUs), and which run the Microsoft Windows NT operating system available from Microsoft Corporation. The application servers 120 will typically have at least 128 MB of random-access memory (RAM) and at least 4 GB of disk space. Processing power may vary from application server to application server. For example, one application server may have four 120 MHz microprocessors, while another application server may have one 90 MHz microprocessor. Each Gateway 126 will typically have at least 64 MB of RAM and at least 2 GB of disk space, and will be capable of supporting approximately 1000 simultaneous user connections.

It is envisioned that the host data center 104 may advantageously have on the order of one hundred Gateways 126, and between several hundred to several thousand application servers 120. A host data center of this type will be able to handle tens of thousands of simultaneous user logon sessions. Advantageously, the processing capacity of the host data center 104 can easily be increased (to support increases in the number of subscribers, for example) by connecting additional Gateways 126 and application servers 120 to the LAN 122, adding additional LANs when necessary. Further, additional host data centers 104 can be provided at different geographical locations to accommodate a wide geographic distribution of subscribers. The multiple host data centers 104 would preferably be interconnected by leased lines and/or by a data network (such as the Internet), and would preferably use TCP/IP to communicate.

The local area network 122 preferably comprises at least one 100 Mbps LAN which is based on the ISO/ANSI Copper Distributed Data Interface (CDDI) specification. (The CDDI specification is a variant of the well-known ANSI Fiber Distributed Data Interface specification, but uses a single copper ring instead of a dual fiber ring.) Various other types of LAN specifications may be used, such as IEEE token ring or switched ethernet. Further, various alternative transmission mediums may be used, including fiber optic lines.

To increase LAN bandwidth, some or all of the microcomputers of the host data center 104 may be interconnected by one or more additional LANs. For example, different LANs may be dedicated to different sets of application servers 120 (and to different services). Accordingly, the term "local area network" (or "LAN"), as used herein, should be construed to include a combination of local area networks, and should not be construed to be limited to a particular data transfer protocol or transmission medium.

The host data center 104 provides a variety of communications-based and information-based on-line services to end users. Typical services include, for example, a mail service for allowing users to send email messages to one another, a bulletin board system (BBS) service for allowing users to post and review messages on specific topics, a chat service for allowing users to communicate in real time with each other on specific topics, an interactive games service for allowing users to compete against each other in real time in on-line interactive games, various news services for allowing users to access news and magazine articles, a mediaview service for allowing users to view on-line multimedia titles, and a directory service for allowing users to view a hierarchy of services and data entities on the network. As described below, the server side of each on-line service is preferably implemented using one of the following: (1) a single application server 120, (2) a set of "replicated" application servers (i.e., application servers which run the same service application or applications) that provide access to replicated (and locally-stored) copies of service "content" data (i.e., data provided to end user's of the service), or (3) a set of replicated application servers that provide access to server-specific (non-replicated) service content data.

The host data center 104 also includes multiple Arbiter microcomputers 128 that monitor, record and process certain types of transactions to ensure consistency among replicated application servers. The various functions performed by the Arbiter microcomputers 128 are described below under the headings SERVICE GROUPS and ARBITER. The host data center 104 also includes one or more custom Gateway microcomputers 130 which link the host data center 104 to one or more external service providers 132, such as a credit card service that validates and executes credit card transactions. Each custom Gateway microcomputer 130 uses the communications protocol required by the external service provider 132 to which the custom Gateway is linked. In other embodiments, the functionality of the custom Gateways 130 may be integrated into the application servers 120.

The host data center 104 also includes a number of administrative servers 134. The administrative servers 134 perform administrative functions such as accounting, billing, network management, backup, system security, performance analysis, and server-to-service allocation. Because the description that follows focuses primarily on the application servers 120 (rather than the administrative servers 134), the term "server" will hereinafter be used to refer to an application server 120 (unless indicated otherwise).

The on-line services offered to end-users of the network 100 are in the form of client-server applications programs (or "service applications"). Each service application includes a server portion (also referred to as a "server application") that runs on one or more of the servers 120, and a client portion (also referred to as a "client application") that runs on a microcomputer 102 of an end user.

In the presently preferred embodiment, the client applications are in the form of Microsoft Windows '95 executables. These client applications are preferably written such that, from the end user's perspective, the various on-line services provided by the host data center 104 appear transparently as an extension to the file structure of the user's hard disk. Server applications are preferably in the form of service dynamic link libraries (DLLs) that are executed by the application servers 120. Although the term "service application" will be used herein to describe applications running on servers 120, it should be understood that only a server portion of the service application is actually running on the servers 120, and that the service application also includes a client portion running on client microcomputers 102 (or running on other computers of the host data center 104 that act as clients).

In accordance with one feature of the invention, service DLLs can be dynamically loaded and unloaded from the servers 120, thereby allowing different services to be efficiently (and automatically) activated and deactivated on different servers. The preferred process by which services are activated and deactivated on different servers is described below under the headings SOFTWARE IMPLEMENTATION OF SERVICES ON SERVERS and DYNAMIC ALLOCATION OF SERVERS TO SERVICE GROUPS.

The term "service" refers generally to the abstract function or functions performed by a particular service application (or group of related service applications). Services generally fall within two categories: "on-line" services that are "seen" by end users when running client applications on client microcomputers 102, and "background" services which are provided to other components of the host data center 104 (when, for example, one server 120 performs a function for another server 120.) Although much of the following description focusses on on-line services, it should be recognized that many features of the invention are applicable to both on-line services and background services.

The architecture of the present invention is characterized as having different servers 120 running different service applications. The various on-line services (and background services) are thus distributed among the servers 120 of the host data center 104. When a server runs a particular service application (or group of related service applications), it is said to be "allocated" to the corresponding service.

In accordance with one feature of the invention, service applications are replicated across multiple servers to form "service groups." The servers of a service group run the same service application (or set of related service applications), and therefore implement the same service (or set of related services). Although multiple servers 120 may be allocated to the same service (or equivalently, to the same service group), a user of the service will normally be serviced by only one of the servers 120 of the service group.

In accordance with another feature of the invention, when a particular service becomes heavily loaded, additional servers are allocated to the heavily-loaded service (by adding servers to the service group) to assist in handling the increased load. As described below under the heading DYNAMIC ALLOCATION OF SERVERS TO SERVICE GROUPS, allocations of servers to services can be performed either by a system operator who monitors the service loads from a control station, or by load monitoring software which compares service loads to predetermined thresholds.

To facilitate the operational description that follows, the following terminology and conventions will be used. The term "client-user" will be used to refer to a client microcomputer 102 under the control of an end user of the on-line services network 100. Names of specific on-line services (and on-line service applications) will be written in capital letters (for example, "CHAT" or "MAIL"), and names of background services will be written in mixed case (for example, "Arbiter" or "Conf_Loc"). Further, the convention {service name}.DLL (for example, "CHAT.DLL") will be used to refer to specific dynamic link libraries used to implement the server portions of service applications.

During a typical logon session, a client-user will maintain a communications link with a single Gateway 126, but may access multiple services (and thus communicate with multiple servers 120). To initially access a service, the client-user sends an "open" request to the service. To terminate a service, the client-user sends a "close" request to the service. The use of a particular service by a single client-user (from the opening of the service to the closing of the service) will be referred to herein as a "service session."

Each time the user opens a service, the Gateway 126 that is handling the logon session accesses a locally-stored service map 136 to select a server 120 that is allocated to the particular service, and then establishes a service instance channel with the selected server 120. The service instance channel is preferably in the form of a TCP/IP link, and is recorded in a session map 522 (shown in FIGS. 5A and 5B) on the Gateway 126.

The service instance channel is maintained throughout the service session, and is used to pass messages between the Gateway 126 and the server 120 as the client and server portions of the service application interact. When multiple simultaneous service sessions are established between a given Gateway 126 and a given server 120, the corresponding service instance channels are multiplexed over a single TCP/IP channel. Messages sent from the client microcomputer 102 to the server 120 are normally in the form of service requests (i.e., requests to have particular services performed by the server portion of the service application). Messages sent from the server 120 to the client microcomputer 102 are normally in the form of responses to specific service requests.

During a service session, the Gateway 126 performs two basic functions. First, the Gateway 126 performs protocol translation, translating messages between the protocol of the WAN 106 (such as X.25) and the protocol of the LAN 122. Second, the Gateway routes messages between WAN channels and LAN channels so as to maintain communications between the client microcomputer 102 and the selected server 120.

Figure 2:
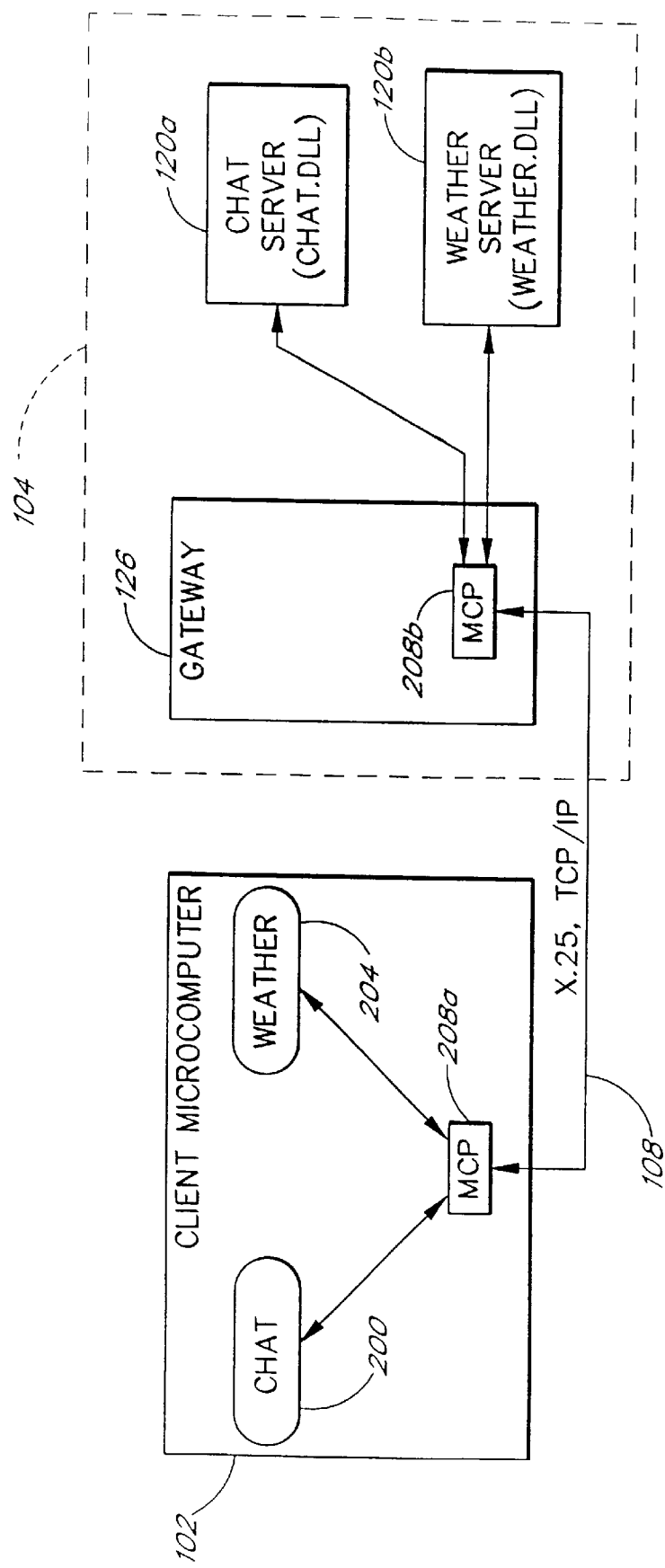
FIG. 2 illustrates a client microcomputer concurrently communicating with two different application servers in accordance with a multiplexing feature of the present invention.

Advantageously, the preferred transport layer (referred to herein as the Microsoft Connection Protocol layer, or "MCP layer") that manages client-Gateway communications supports simultaneous service sessions, allowing a client-user to access multiple services simultaneously. Thus, for example, a user can access one on-line service while downloading a large software update file from another on-line service. This feature of the present invention is illustrated in FIG. 2 for a user who has opened two services, CHAT and WEATHER. The CHAT and WEATHER client applications 200 and 204 generate message streams that are passed to an MCP layer 208a that is running on the client microcomputer 102. The MCP layer 208a multiplexes these two message streams and sends the multiplexed data to a Gateway 126 at the host data center 104. The MCP layer 208b running on the Gateway 126 demultiplexes the data, and routes the respective message streams (over the LAN 122) to the appropriate servers 120a and 120b. Likewise, the MCP layer 208b on the Gateway 126 multiplexes the message streams that are generated by the CHAT and WEATHER servers 120a and 120b, and the MCP layer 208a on the client microcomputer 102 demultiplexes these message streams and passes them to the respective client applications 200 and 204. In the example shown, the user could, for example, download a large bitmap image of a weather satellite photo while simultaneously communicating in real time with another CHAT user. The MCP layer is further described below under the heading CLIENT-GATEWAY COMMUNICATIONS.

2. Service Groups

As indicated above, when multiple servers 120 are allocated to the same service they form what is referred to herein as a service group. The creation of a service group is desirable, for example, when the processing load placed on a service cannot be adequately handled by a single server 120. Normally, all servers 120 within a service group are replicated, meaning that they all run the same service application (or set of service applications) that implements the server portion of a particular service (or set of related services). Each client service session can thus be handled by a single server 120 within the service group.

For certain types of on-line services, all replicated servers of the service group maintain local copies of the service's content data, and provide user access to such data. Because all such servers run like service applications and provide access to like service data, the service appears the same to all users, even though different user service sessions may be assigned (by the Gateways 126) to different servers 120 of the service group.

It should be recognized from the foregoing that although a service session will normally be handled by a single server 120, the entity that provides the service as a whole is the service group. The service performed by a service group can be either an on-line service (such as CHAT or MAIL), or a background service (such as the Conf_Loc service which is used to locate CHAT conferences, as described below).

Figure 3:
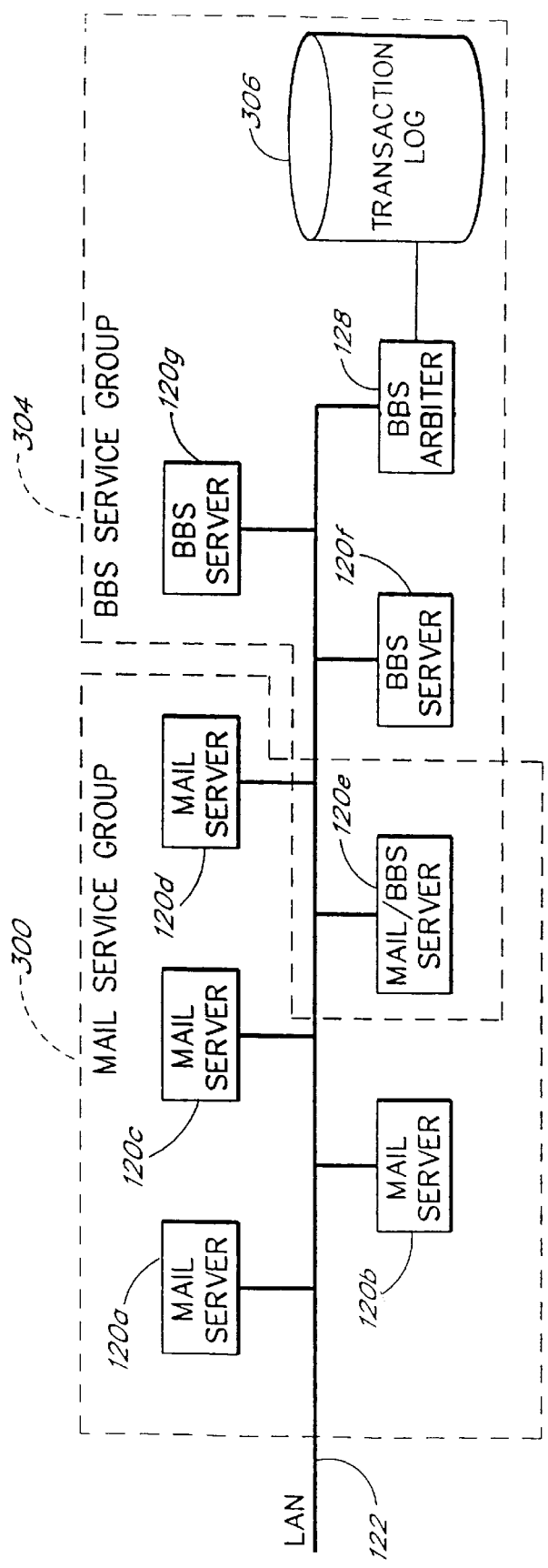
FIG. 3 illustrates, in example form, how different application servers can be assigned to different service groups.

An example allocation of servers 120 to services is illustrated in FIG. 3. In this example, four application servers 120a–d have been allocated solely to a MAIL service and two application servers 120f and 120g have been allocated solely to a BBS service. Server 120e is allocated to both the MAIL service and the BBS service, and thus runs both MAIL and BBS service applications. In this example configuration, servers 120a–e fall within the MAIL service group 300, and servers 120e–g fall within the BBS service group 304. Further, servers 120a–e are all replicated of one another (meaning, in this example, that they all run the same MAIL service application), and servers 120e–g are all replicated of one another (meaning that they all run the same BBS service application).

Certain types of on-line services provide end users with access to service-wide (or equivalently, service-group-wide) data sets (also referred to generally as "service content data") which change on a transaction-by-transaction basis. The BBS service is an example of such a service; each time a user posts a message, a data set is modified such that all users of the BBS service (regardless of the particular BBS server to which a user is assigned) have access to the message. Transactions of this general type (i.e., transactions which affect service-wide data sets) will hereinafter be referred to as "update transactions," and can originate from a variety of sources. For example, an update transaction can originate from a client microcomputer 102 when an end user posts a BBS message, or can originate from an external data provider that is connected to the host data center 104 by the Internet.

Although service content data could be stored in a central data base which is accessible to all servers 120 of the corresponding service group, for performance reasons, it is normally preferable (depending upon the particular service) to have each server 120 of the service group locally store redundant copies some or all of the service's content data. To ensure consistency between such locally-stored data sets (so that all users of the service see the same data), an Arbiter service is used to replicate update transactions across all servers 120 of a service group. In the preferred embodiment, the Arbiter service runs on the Arbiter microcomputers 128, and one Arbiter microcomputer 128 is allocated to each service (i.e., to each service group) that uses the Arbiter service to replicate update transactions.

In the preferred implementation of the BBS service, the Arbiter service is used to replicate message postings. Thus, in the example configuration shown in FIG. 3, a BBS Arbiter microcomputer 128 is allocated to the BBS service group 304. To accommodate increased numbers of BBS users, multiple BBS service groups (not shown) may be formed, with each BBS service group handling a specific topic or set of topics. A separate Arbiter microcomputer 128 would then preferably be used for each BBS service group.

In the preferred implementation of the MAIL service, each user is assigned to a particular MAIL server 120 (i.e., the user's mailbox is stored on only one MAIL server), and email messages directed to a user are forwarded to the user's MAIL server by the other MAIL servers. Thus, the replication services of the Arbiter are not required, and no Arbiter microcomputer is allocated to the MAIL service group 300.

The Arbiter service is further described below under the heading ARBITER.

3. Service Map

Referring again to FIG. 1, in order to route client-user service requests to the appropriate servers 120, the Gateways 126 must have some way of determining the unique IDs of the servers that are currently handling the requested services. This is accomplished by means of the service map 136, which contains information about every service and server 120 in the host data center 104. The service map 136 also contains information about the current load of each server 120 in the host data center 104. This load information is used to uniformly distribute the service load among the servers 120, as further described below under the headings DYNAMIC LOAD BALANCING BY ROUTING OF SERVICE REQUESTS and DYNAMIC ALLOCATION OF SERVERS TO SERVICE GROUPS.

Still referring to FIG. 1, the service map 136 is preferably generated by a service map dispatcher 144, which may be implemented on a single microcomputer. To generate the service map 136, each server 120 periodically generates a local map 140, and transmits the local map 140 to the service map dispatcher 144. Each local map 140 contains up-to-date information about the respective server 120 that generated the local map, including information about the server's current load. The service map dispatcher 144 builds the service map 136 from all of the local maps 140 it receives, and then broadcasts the service map 136 to all of the Gateways 136 over the LAN 122. In other embodiments, the servers 120 broadcast their respective local maps 140 to the Gateways 126, and each Gateway builds the service map 136 from the local maps it receives.

In the preferred embodiment, the service map dispatcher 144 broadcasts a new service map 136 every 30 seconds. Each time a new service map 136 is broadcasted, every Gateway 126 receives and locally stores a copy of the new service map 136, overwriting old versions of the service map. The Arbiters microcomputers 128 also receive and store copies of the service map 136, and use the service map to determine the states of the servers 120 that are currently assigned to the respective service groups.

Figure 4:
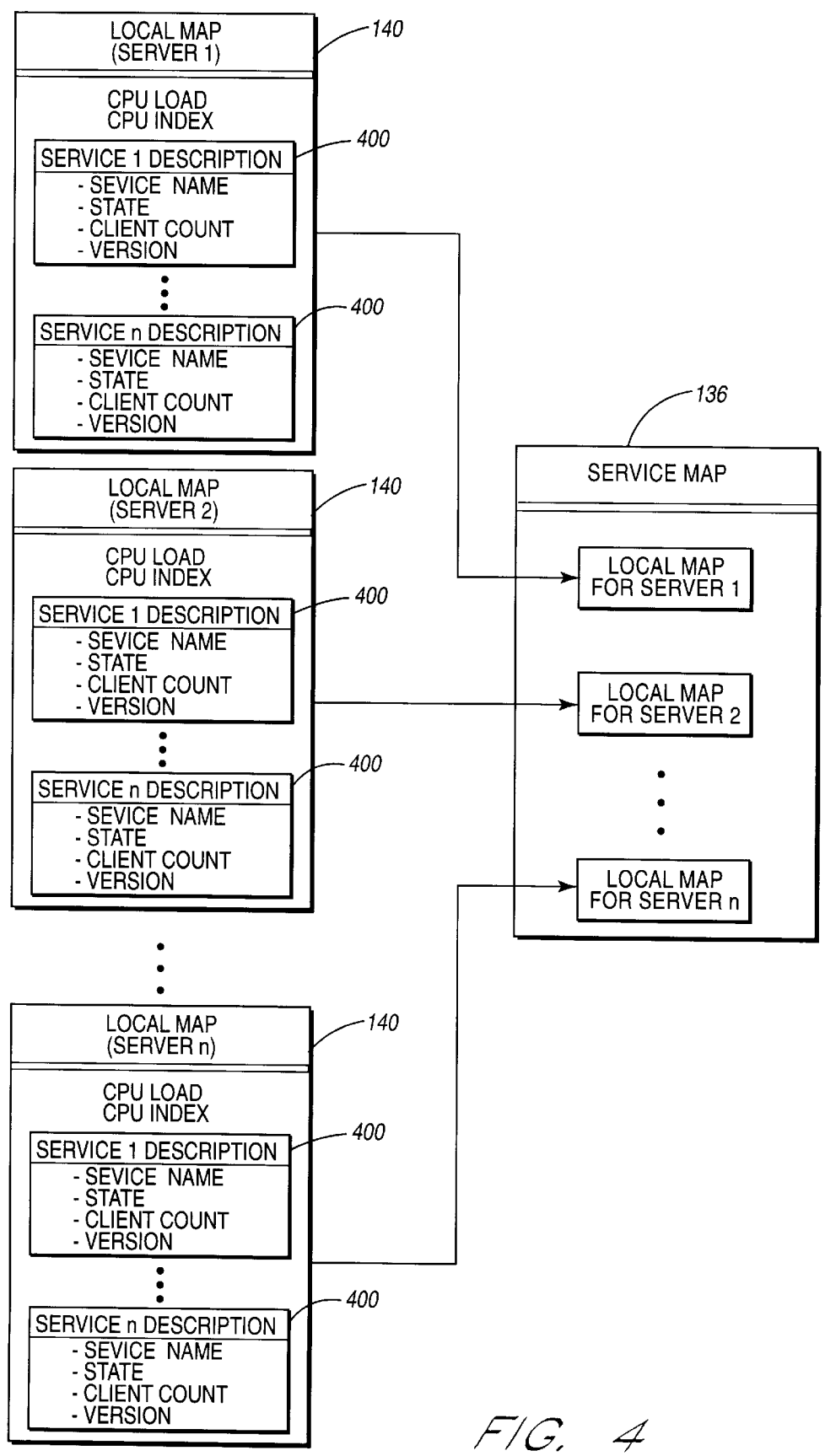
FIG. 4 illustrates how a service map may be generated from server-specific local maps.

FIG. 4 illustrates the information contained within each server-specific local map 140, and also illustrates the process by which the service map dispatcher 144 builds the service map 136 from the local maps 140. The service map 136 contains the local map 140 for each operational server 120 within the host data center 104, along with the corresponding server IDs (indicated by the numbers 1, 2, . . . n) for the servers 120.

Each local map 140 contains a CPU LOAD value and a CPU INDEX value for the respective server 120. The CPU LOAD indicates the current load of the server 120. The CPU LOAD is a numerical value, preferably ranging from 0 to 100, which indicates the percentage of available time that the CPU (or CPUs) of the server 120 is processing service requests. A CPU LOAD of zero indicates that the server 120 is minimally loaded, and a CPU LOAD of 100 indicates that the server is heavily loaded. In the preferred embodiment, the CPU LOAD is periodically calculated by the operating system (NT) on each server 120, and is taken as an average over a 5 second period. The CPU LOAD values contained in the local maps 140 are periodically updated to reflect changes in server loads.

The CPU INDEX is a static benchmark value, indicating the processing power of the particular server 120. In the preferred embodiment, the CPU INDEX is a benchmark that measures the server's performance under Microsoft Windows NT, although other conventional benchmarks could be used. The CPU INDEX accommodates for servers 120 of varying processing powers, and can be omitted in system configurations for which all servers 120 have substantially the same processing power.

Together, the CPU LOAD and CPU INDEX for a server 120 indicate the available processing power for the server, and are thus useful for identifying the servers 120 that are most capable of handling new service sessions. The various methods for selecting servers 120 based on CPU LOAD and CPU INDEX values are described below under the heading DYNAMIC LOAD BALANCING BY ROUTING OF SERVICE REQUESTS.

With further reference to FIG. 4, each local map 140 contains at least one service description 400, and contains multiple service descriptions 400 (as shown in FIG. 4) if the server 120 is currently allocated to multiple services. Each service description 400 includes a service name, the state of the service DLL (launching, active, active-accepting, or stopped), the client count (i.e., the number of client-users that are currently assigned to the server 120 to use the service), and the version number of the service DLL. The service descriptions 400 contained within the service map 136 are used for various purposes by different components of the host data center 104. For example, the service descriptions 400 are used by the Gateways 126 to locate servers 120 for handling client service requests.

The service map 136 advantageously serves to inform the Gateways 126 (and other components of the on-line services network 100) of the addition, deletion or change in state of any server 120 in the system. The use of the service map 136 thereby allows changes to be made to the servers 120 of the system without manual intervention. By way of example, assume that a new server 120 is added to the host data center 104, and is initially configured to act as a MAIL server. Shortly after being brought up, this new MAIL server will generate and send a local map 140 to the service map dispatcher 144. The service map dispatcher 144 will then broadcast the local map 140 (as part of the next service map 136) to all of the Gateways 126, allowing the Gateways to send service requests to the new MAIL server. Thus, once the new server 120 has been configured, its addition to the system is automatic, requiring no system operator intervention.

In addition to generating a service map 136, the service map dispatcher 144 maintains a central repository of information referred to as the "global registry" 145. The global registry 145 contains various information about the present configuration of the host data center 104. For example, for each service group, the global registry 145 indicates the IDs of the servers 120 of the service group, and the identity of the Arbiter microcomputer 128 (if any) which is assigned to the service group. Of course, the global registry 145 could be maintained by some entity other than the service map dispatcher 144.

4. Communications Components

Figure 5A:
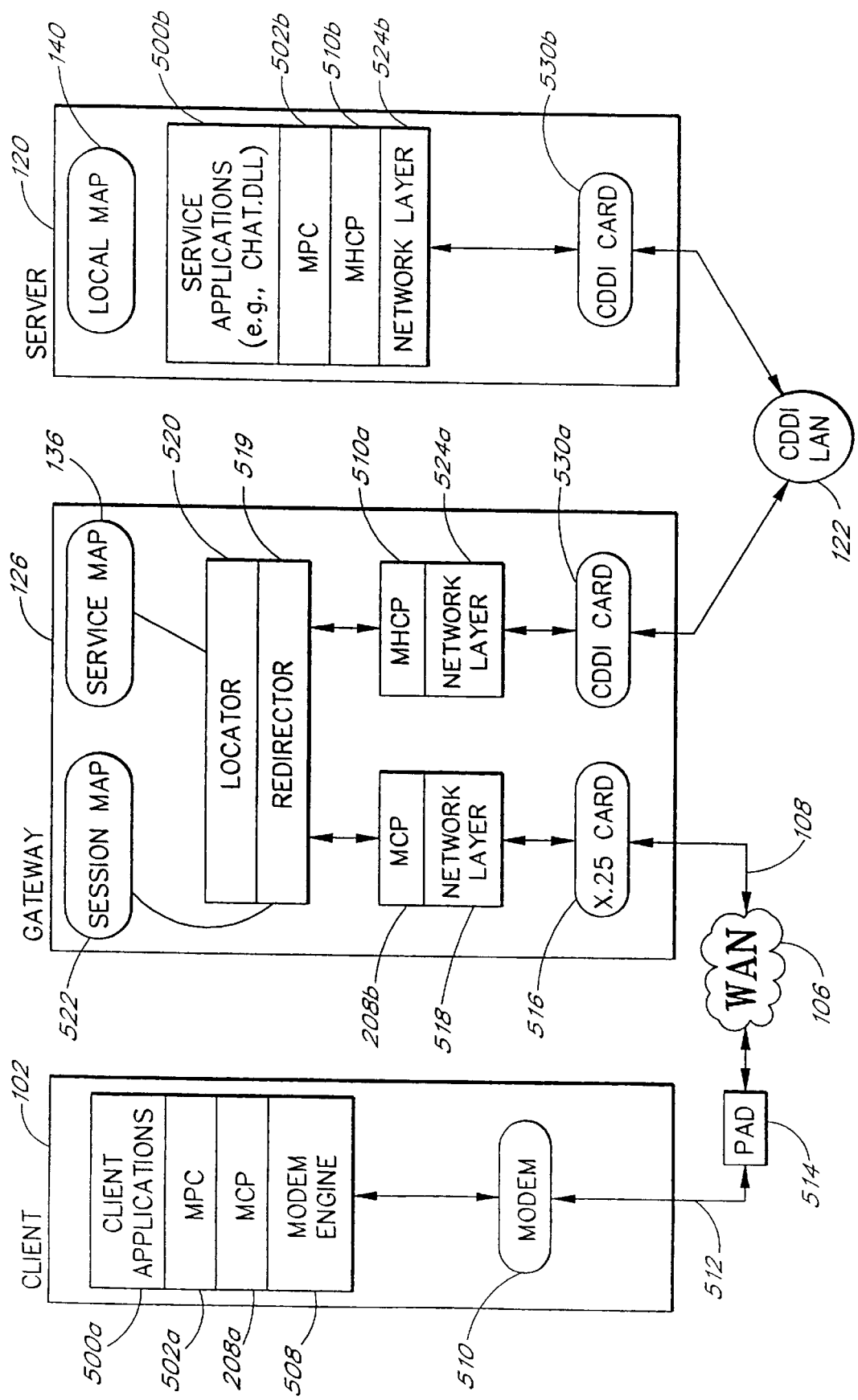
FIG. 5A illustrates the primary software and hardware communications components used when a user connects to the network by modem.
Figure 5B:
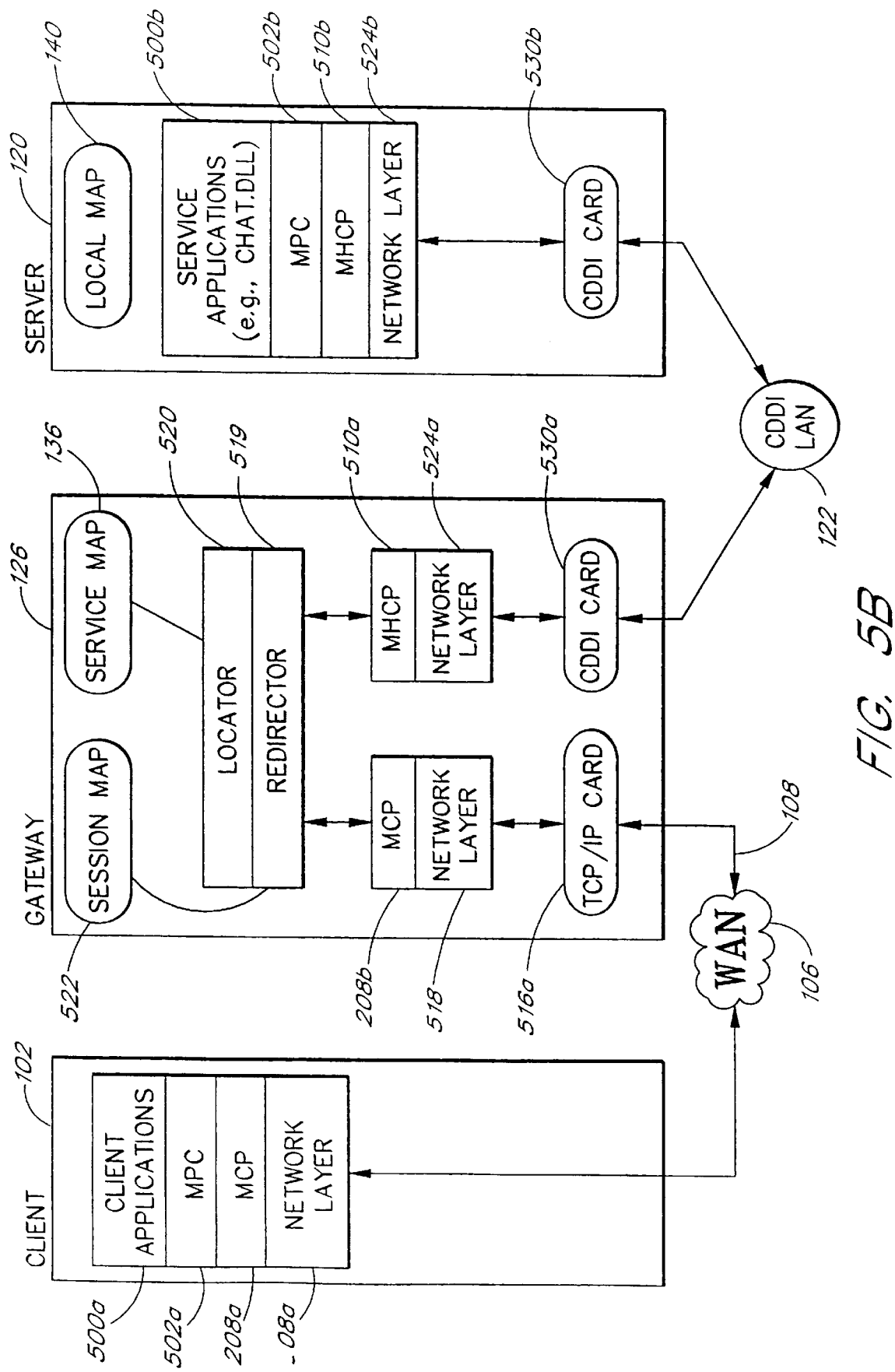
FIG. 5B illustrates the primary software and hardware communications components used when a user connects to the network using TCP/IP.

FIGS. 5A and 5B illustrate the basic communications components, including the protocol layers provided within the client, Gateway, and server microcomputers 102, 126, 120, for a preferred embodiment of the on-line-services network 100. The communications components shown in FIG. 5A are used when an end user logs onto the network via modem 510. The communications components shown in FIG. 5B are used when the end user logs onto the network via a TCP/IP connection (such as an ISDN link).

With reference to FIGS. 5A and 5B, client applications 500*a* make use of a high-level application programming interface (API), referred to herein as the Microsoft Procedure Call layer, to communicate with server portions of service applications 500*b*. The Microsoft Procedure Call layer (hereinafter "the MPC layer") is an optimized remote procedure call (RPC) layer, optimized to permit efficient client-server communications over a relatively slow WAN. Unlike conventional RPC, the MPC layer allows a client application to send out multiple requests without receiving a response, and allows each request to be individually monitored and/or canceled from the client side. The MPC layer is shown in FIGS. 5A and 5B as comprising respective layers 502*a* and 502*b* within the client microcomputer 102 and the server 120. (Depending upon the context in which it is used herein, the term "layer" may refer either to a specific set of structures and routines on a particular machine, or may refer to the general functionality of such structures and routines as a whole.) Requests from the MPC layer 502*a* are passed to the MCP layer, which is shown in FIGS. 5A and 5B as comprising respective layers 208*a* and 208*b* in the client microcomputer 102 and the Gateway 126. The MCP layer is seen by the MPC layer as providing reliable end-to-end client-Gateway communications. The MCP layer handles various aspects of client-Gateway communications, including packetization (for X.25 connections), segmentation and multiplexing of message streams, flow control (using a sliding window algorithm), and error correction (using CCITT CRC-32). In addition to supporting X.25, the MCP layer supports TCP/IP user connections (FIG. 5B). In accordance with one feature of the invention, when a client-user concurrently accesses multiple services, the MCP layer allocates WAN bandwidth to services based on the differing throughput requirements of the services. In addition to implementing a preferred communications protocol, the MCP layer also includes a client API and a server API for interfacing respectively with client and server portions of service applications. The MCP layer is further described below under the heading CLIENT-GATEWAY COMMUNICATIONS.

With reference to FIG. 5A, when the client-user accesses the on-line services network 100 by a modem 510, the MCP layer 208*a* communicates with a modem engine layer 508, which in-turn communicates with the modem 510. The modem 510 communicates over a telephone line 512 with a carrier-provided PAD (packet assembler-disassembler) 514 that translates data between a standard modem format and the WAN format (which is X.25 in the FIG. 5A example). At the Gateway 126, an X.25 network card 516 sends and receives data over an X.25 line 108, and communicates with an X.25-specific network layer 518. With reference to FIG. 5B, when the user accesses the on-line services network 100 via a TCP/IP connection, the MCP layer 208*a* on the client microcomputer communicates with a network layer 508*a*, and the network layer 508*a* communicates over the WAN 106 with a TCP/IP card 516*a* of the Gateway 126.

Within the Gateway 126, a redirector layer 519 communicates with a locator program 520. The redirector layer 519 and the locator program 520 perform the functions of (1) selecting servers 120 for handling requests to open services (referred to herein as "open" requests), and (2) routing the "open" requests so as to distribute processing loads within service groups. (As indicated above, a client-user will typically generate a number of "open" requests throughout a logon session, since the user will typically access multiple services. Additional service requests will normally be generated by the client-user throughout the course of each service session.) The locator program 520 accesses a locally-stored copy of the service map 136 whenever an "open" request is received from a client microcomputer 102. Each time a server 120 is selected to handle an open request, the redirector layer 519 records the selected server's ID within a session map 522. In the course of an ongoing service session, the Gateway 126 accesses its session map 522 whenever a client-server message is received, and uses the session map to properly route the message.

The redirector layer 519 communicates with the MCP layer 208*b* to communicate with client microcomputers 102, and communicates with a Microsoft Host Connection Protocol (MHCP) layer 510*a* to communicate with servers 120. The MHCP layers 510*a* and 510*b* perform various transport-layer-type functions, such as formatting of message data for transmission over the LAN 122, and multiplexing of message data for transmission over TCP/IP links of the LAN 122. The MHCP layers 510*a*, 510*b* communicate with CDDI network layers 524*a* and 524*b*, which in-turn communicate with CDDI network cards 530*a* and 530*b*.

It will be recognized that although the implementation depicted by FIGS. 5A and 5B use specific communications protocols and protocol layers, various alternative protocols and protocol layers could be used.

5. Dynamic Load Balancing by Routing of Service Requests

Figure 6:
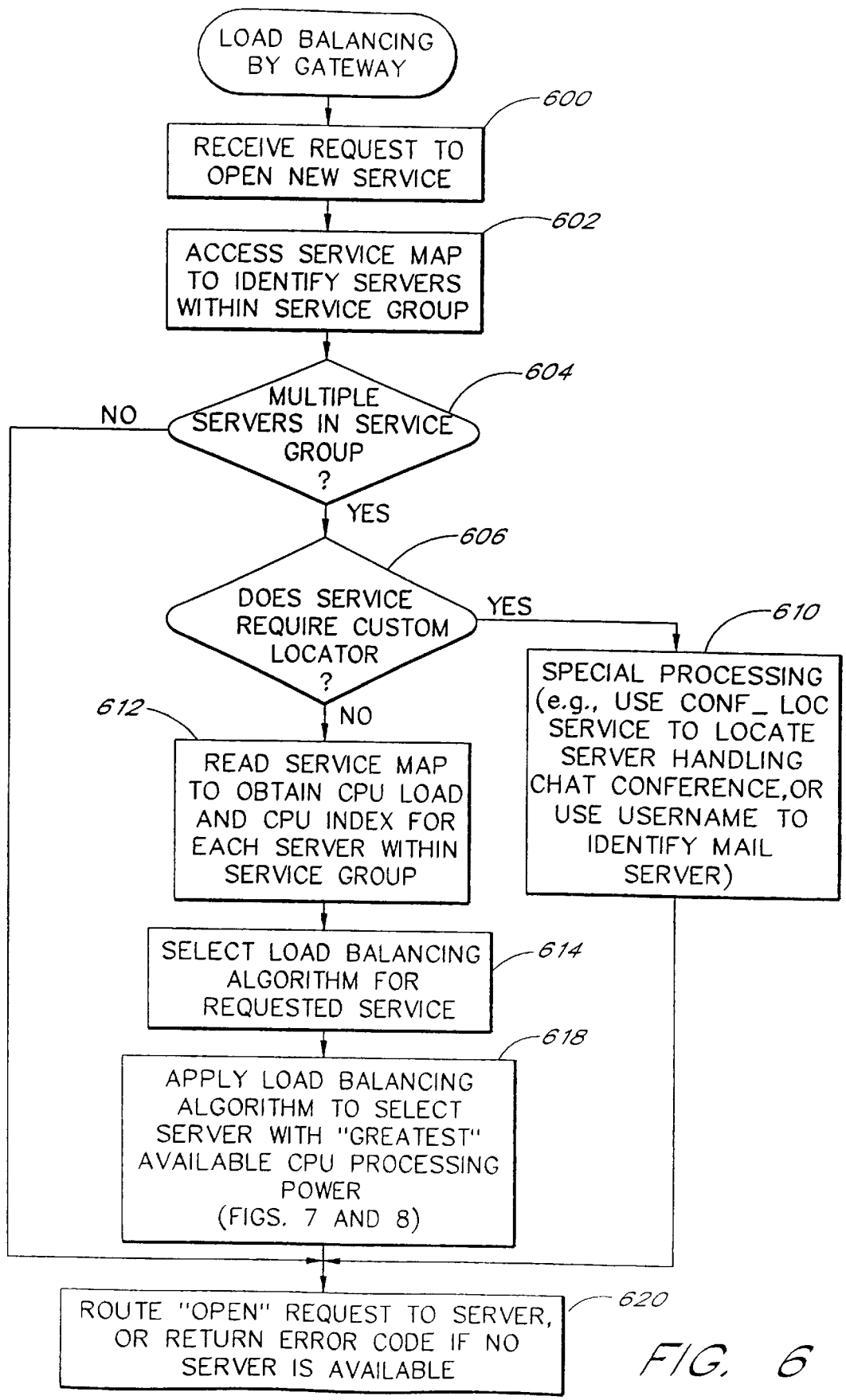
FIG. 6 is a flow chart illustrating the steps taken by a Gateway microcomputer upon receiving a request from a user to open a service.

FIG. 6 illustrates a preferred sequence of steps that is performed whenever a Gateway 126 receives an "open" request from a client-user. As indicated by blocks 600 and 602, the Gateway 126 initially accesses the current service map 136 to determine the number of servers 120 that are allocated to the requested service. If only one server 120 is currently assigned to the service, the Gateway routes the service request to that server, as indicated by blocks 604 and 620. If the number of servers 120 assigned to the service is zero, an error code is returned, as indicated by block 620.

If multiple servers 120 are assigned to the service group, the Gateway 126 then determines whether or not the particular service requires load balancing, as indicated by the decision block 606. Although load balancing is appropriate for most services, certain services require that service requests be handled by a particular server 120, and thus require the use of a custom locator program (as indicated by block 610) to identify the correct server.

An example of a service which requires a custom locator program is CHAT. Although multiple servers 120 can be assigned to the CHAT service, each CHAT conference is preferably handled by a single server 120 (to facilitate communications between users who have joined the CHAT conference). Thus, when an end user generates a request to join a specific CHAT conference (by, for example, specifying a particular CHAT topic), the identify of the particular CHAT server 120 that is handling the CHAT conference must be determined. In the preferred embodiment, the CHAT server 120 is identified using a special Conf_Loc (conference locator) service, which is a background service (running on one or more of the servers 120) that maps CHAT resources to servers. To identify the CHAT server 120, the following step are performed:

(a) The client (i.e., the client application running on a user's microcomputer 102) sends an "open" request to the Conf_Loc service. The Gateway 126 applies load balancing (in accordance with the flowchart of FIG. 6) to select a Conf_Loc server 120 to handle this open request.

(b) The client sends a request to the Conf_Loc service (which is routed by the Gateway 126 to the Conf_Loc server identified in step a) to return the server ID corresponding to the identified CHAT conference, and waits until the requested server ID is returned. (If the requested CHAT conference does not exist, the Conf_Loc service will start a new CHAT conference and return the ID of the server that will be handling the new CHAT conference).

(c) The client closes the Conf_Loc service.

(d) The client sends an "open" request to a Conf_Srv service with a parameter specifying the CHAT server ID. The custom locator for the Conf_Srv service on the Gateway 126 parses this parameter and returns the CHAT server ID to the redirector layer 519 on the Gateway. This connects the client to the CHAT server.

In an alternative embodiment, the client sends an "open" request to the CHAT service with a parameter specifying the conference name, and A CHAT custom locator uses this parameter to identify the server ID of the CHAT server 120, starting a new conference if necessary. The CHAT custom locator then returns the server ID of the CHAT server to the redirector layer 519. This alternative method does not require the use of a separate Conf_Loc service.

Another example of a service which requires a custom locator program is MAIL. (As described above, each user's mailbox is preferably stored on only one of the MAIL servers.) When a user requests access to his or her mailbox, a MAIL locator service is provided with the username (or other user identifier) of the end-user, and the MAIL locator returns the server ID of the mail server which stores the user's mailbox.

With reference to blocks 612 and 614, if the requested service does not require the use of a custom locator program, the Gateway 126 reads the service map 136 to obtain the CPU LOAD and CPU INDEX values for every server within the service group. The Gateway then accesses a table which specifies a load balancing method to use for the service. Although the same load balancing method could be used for all services, it has been found that a more uniform load balancing result can be achieved by taking into account the differing processing demands placed on the servers 120 by different service applications. Two load balancing methods, and some variations of these methods, are discussed below.

With reference to blocks 618 and 620, once a load balancing method has been selected, the method is applied to select a server 120 within the service group. The "open" request is then passed to the selected server.

Figure 7:
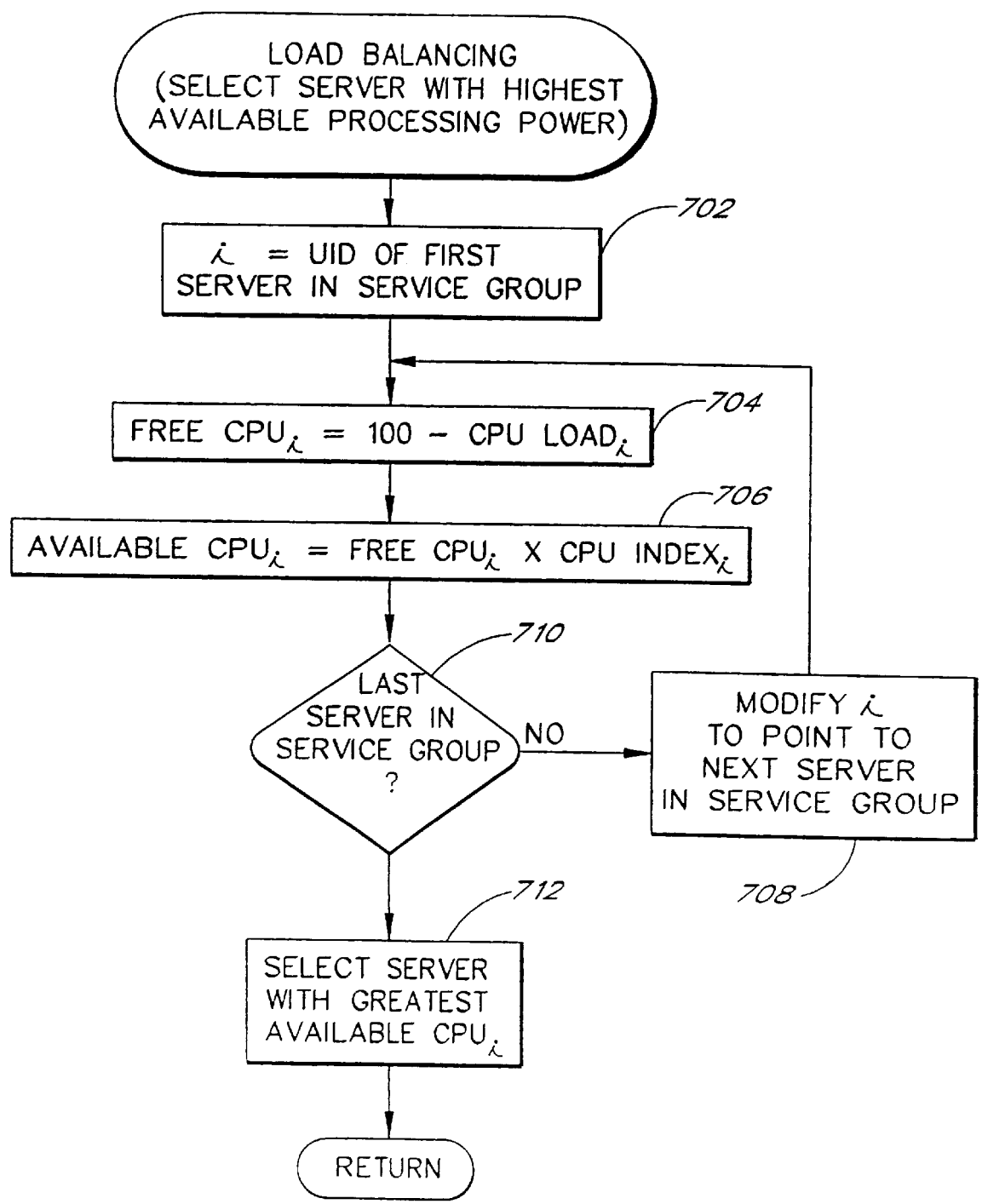
FIG. 7 is a flow chart illustrating a load balancing technique used to select an application server to handle a request to open a service.

FIG. 7 illustrates a first preferred load balancing method, which selects the server 120 which most recently had the highest available CPU processing power. As illustrated by blocks 702–710, the CPU LOAD and CPU INDEX values for each server 120 in the service group are used to calculate an AVAILABLE CPU value for each such server. The available CPU processing power (AVAILABLE CPU) is calculated for a server 120 by multiplying the server's CPU INDEX by the server's FREE CPU, where FREE CPU is a value ranging from 0 to 100 which is simply calculated by subtracting CPU LOAD from 100. With reference to block 712, once AVAILABLE CPU has been calculated for each server 120 in the service group, the server with the highest AVAILABLE CPU is selected to handle the service request.

The method illustrated in FIG. 7 works well provided that the actual server loads remain relatively static between service map updates (which occur every 30 seconds in the preferred embodiment), so that the CPU LOAD values in current service map can be relied upon. For certain types of services, however, relatively small changes in the number of ongoing service sessions can cause significant changes in server loads. An example of such a service might be an interactive video games service which requires a significant amount of server processing power per user. With the load balancing method of FIG. 7, all requests for the service over a period of 30 seconds would be routed to the same server 120 within the service group, potentially overloading the server. This problem could be alleviated by updating the service map 136 more frequently, but at the cost of increased use of available bandwidth on the LAN 122.

Figure 8:
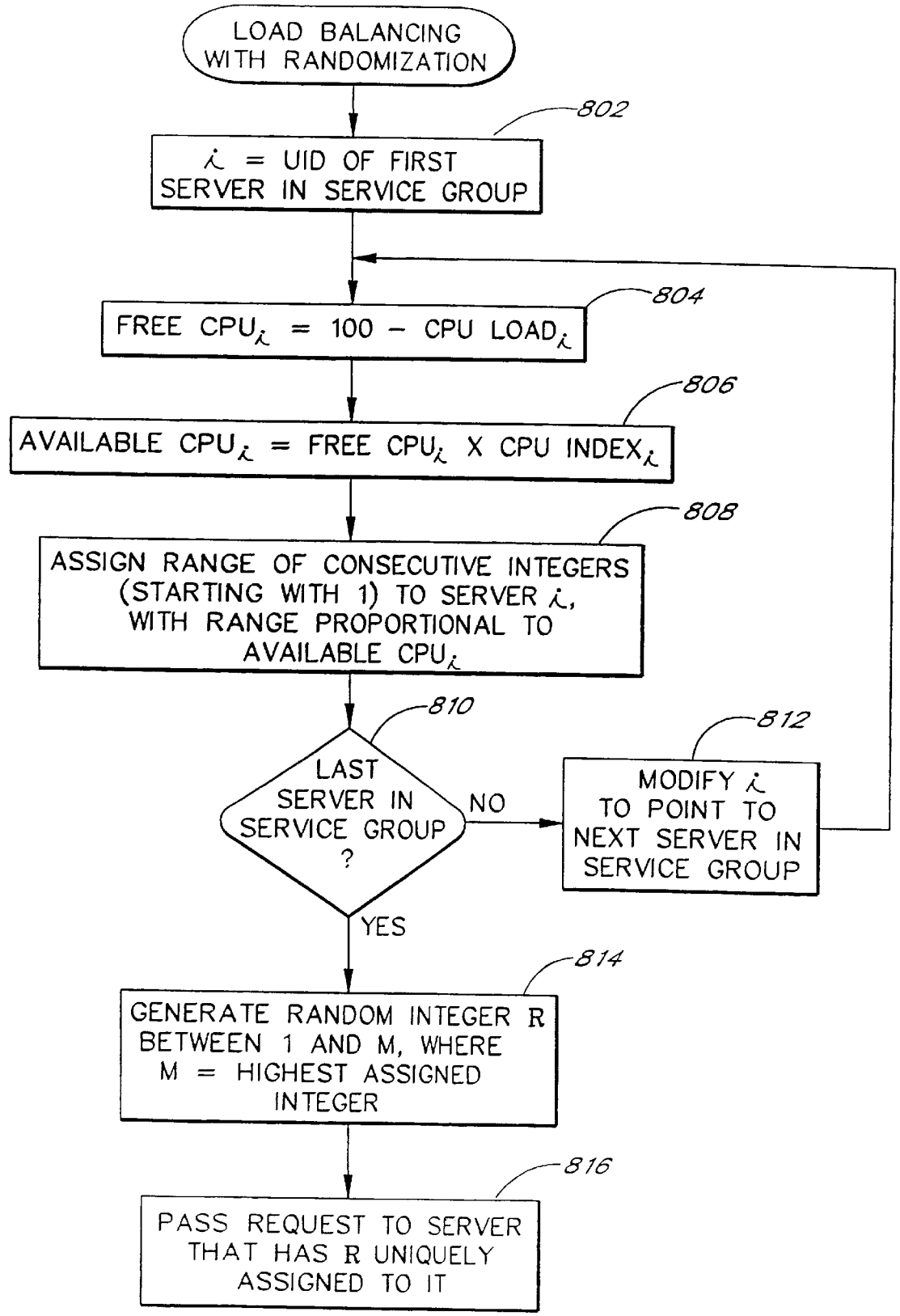
FIG. 8 is a flow chart illustrating a variation of the load balancing technique of FIG. 7.

A preferred solution to this problem is to employ a randomization technique in selecting a server 120. FIG. 8 illustrates a preferred load balancing method which uses randomization. As with the method of FIG. 7, the Gateway 126 calculates the AVAILABLE CPU for each server 120 within the service group, as indicated by blocks 802–812. However, as indicated by block 808, rather than selecting the server 120 with the highest AVAILABLE CPU, each server is assigned a unique range of consecutive (positive) integers such that the number of integers assigned to a server is proportional to the server's AVAILABLE CPU. In assigning ranges, the first assigned range of numbers begins with 1, and each successive range begins with the lowest unassigned integer. By way of example, assume that the service group consists of three servers, Server A, Server B and Server C, and that Server A has twice the available CPU processing power of Server B and four times the available CPU processing power of Server C. According to the method, the ranges integers could be assigned as follows: Server A←1–200; Server B←201–300; Server C←301–350.

As indicated by block 814, a pseudo-random integer R between 1 and M is then generated (using a standard pseudo-random number generator) by the Gateway 126, where M is the highest assigned integer (350 in the above example). As indicated by block 816, the server 120 that has the integer R assigned to it is then selected to handle the "open" request. By selecting servers in this manner, the probability of selection of a server is proportional to the available CPU processing power of that server.

As will be recognized by those skilled in the art, various alternative load balancing methods are possible. It will further be recognized that the load balancing function need not be performed by the Gateways 126. For example, the Gateways 126 could be programmed to pass each "open" request to one of the servers 120 within the service group, and the recipient server could apply the load balancing method and (if necessary) reroute the request.

Although the load balancing methods of FIGS. 7 and 8 use a specific type of load data to balance the processing load among the servers 120, it will be recognized that various other types of load data could be used. For example, the current client count for each server 120 could be used as a basis for load balancing.

6. Software Implementation of Services on Servers

As indicated above, server portions of service applications are preferably in the form of service DLLs (dynamic link libraries) which run under the Microsoft Windows NT operating system. Typically, a server 120 will be assigned to only a single service at a time. However, as indicated above, one server 120 can run multiple service applications concurrently, and can thus be assigned to two or more services simultaneously. The ability for a server 120 to handle multiple services concurrently advantageously allows hardware resources to be allocated to services with a high degree of granularity.

Figure 9:
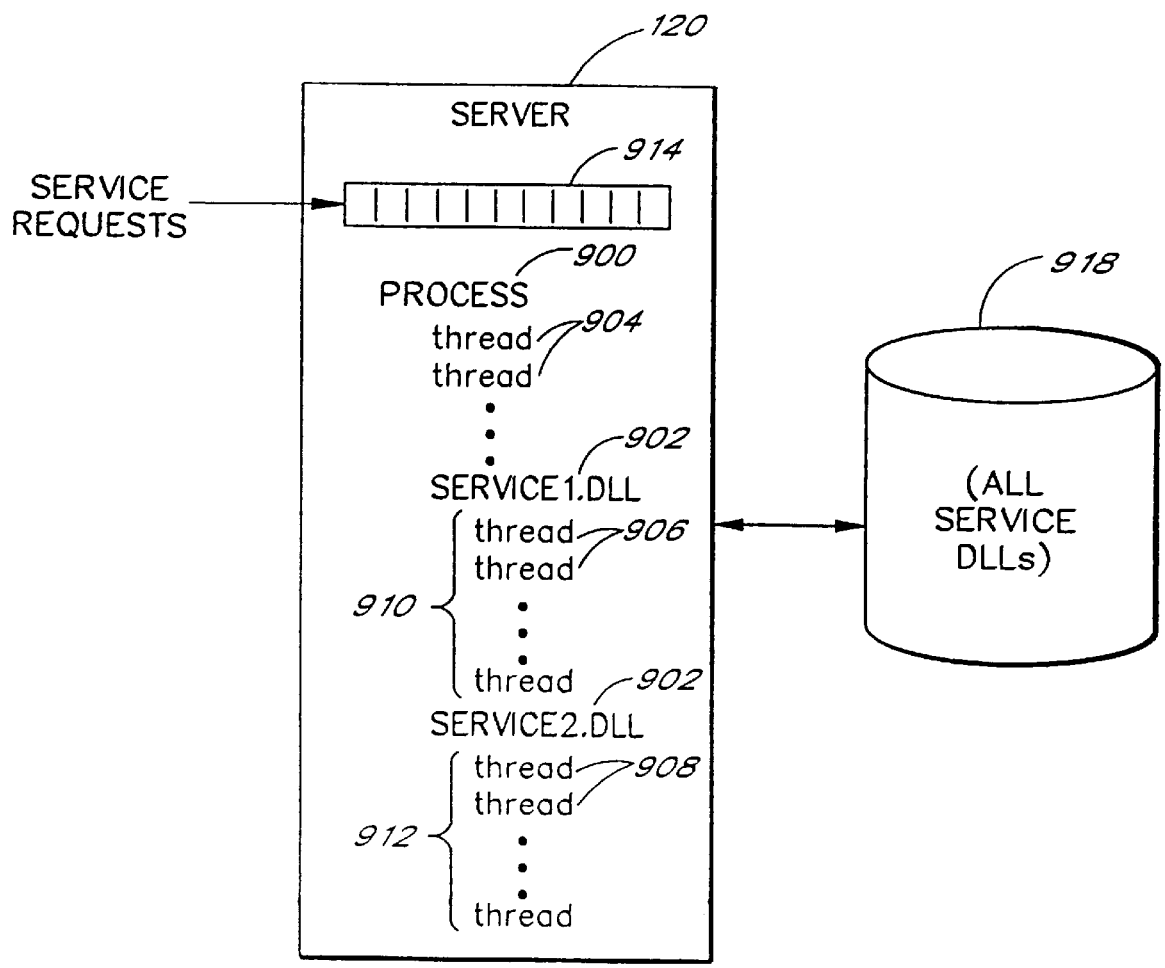
FIG. 9 illustrates a preferred software implementation of services on an application server.

FIG. 9 illustrates a preferred architecture for the servers 120 of the on-line services network 100. All service DLLs 902 (two shown for the server 120 in FIG. 9) run as part of a single, multi-threaded NT process 900. The two service DLLs 902 shown in FIG. 9 could be, for example, a CHAT.DLL and a BBS.DLL, which implement the server portions of the CHAT and BBS service applications respectively. One or more threads 904 are process-wide threads which perform functions that are not specific to any particular service, while other threads 906, 908 are dedicated to the particular services.

As is well known in the art, a thread is a schedulable entity of a process, and represents a sub-task of the process. During execution of a thread, the thread resides within the process's virtual address space. Advantageously, all of the threads of an NT process share the address space and the process's resources, including the process's access token, base priority, and object handles. A description of processes and threads under the Microsoft Windows NT operating system can be found in Helen Custer, *Inside Windows NT*, Microsoft Press, 1993.

In the preferred embodiment, a pool of threads is maintained for each server application running under the process 900, and threads are dispatched from the pool on a per-service-request basis. In the example shown in FIG. 9, a first pool 910 contains the threads 906 that are dedicated to SERVICE1.DLL, and a second pool 912 contains the threads that are dedicated to SERVICE2.DLL. Service requests (typically in the form of messages from client microcomputers 102) that are routed to the server 120 are placed in a service request queue 914, and are extracted from the queue 914 by the first available thread within the corresponding pool 910, 912. Although a single service request queue 914 is shown in FIG. 9, a separate queue may be allocated to each service DLL.

The use of a single multi-threaded process (as opposed to multiple processes) to handle multiple sessions of the same service is particularly advantageous for services that permit the interaction or exchange of information between users. Examples of such services are CHAT and multi-user interactive games. With CHAT, for example, a message typed in by one user will be displayed on the monitors of one or more other users who are participating in the CHAT conference. Prior art designs, which use a separate process for each user, require interprocess communications (often between large numbers of processes) to accomplish this exchange of information between users, requiring a high degree of operating system overhead. Such overhead is significantly reduced in the present design, since no special data passing mechanisms are required for passing data between threads; one user-specific thread simply writes its data to the shared memory, and other user-specific threads then read the data as input.

A further advantage of using a single multi-threaded process to handle multiple service sessions is the ability to have individual threads that handle operations that are common to all users. For example, a single thread 904 of the process 900 can be used to monitor user inactivity for all users of the server 120.

In accordance with another feature of the invention, particular services can be automatically activated or deactivated on the server 120 (or any server of the system) by loading and unloading service DLLs dynamically (i.e., without stopping the process 900). In the preferred embodiment, the process 900 dynamically loads and unloads DLLs (in response to commands issued from a system console microcomputer over the LAN 122) using the LoadLibrary(), GetProcAddress(), and FreeLibrary() functions of Microsoft's Win32 API. The LoadLibrary() function is described at pages 86 and 87 of *Microsoft Win32 Programmer's Reference Manual, Volume* 4, (Microsoft Press, 1993,, ISBN 1-55615-518-2). The GetProcAddress() and FreeLibrary() functions are described at page 653, and at pages 484–485, respectively, of *Microsoft Win32 Programmer's Reference Manual, Volume* 3, (Microsoft Press, 1993, ISBN 1-55615-517-4). Briefly, these functions do the following. The LoadLibrary() function maps a specified DLL module (or other executable module) into the address space of the calling process 900, and returns a handle to the module. The GetProcAddress() function uses the handle (returned by the LoadLibrary() function) and a DLL function name as input parameters, and returns the address of the specified DLL function. The FreeLibrary() unmaps a specified DLL module from the address space of the calling process 900.

By way of example, to add the CHAT service to the server 120 shown in FIG. 9, the DLL for the CHAT service (CHAT.DLL) would be loaded into RAM from the server's hard disk 918. The process 900 would then call the LoadLibrary() and GetProcAddress() functions to link to CHAT.DLL and implement the CHAT service. The process 900 may subsequently use the FreeLibrary() function to dynamically unload the DLL. In the preferred embodiment, all service DLLs for all on-line services are stored on the hard disks 918 of all servers 120 of the system, so that any service can be automatically activated on any server 120 at any time.

Prior to dynamically unloading a service DLL from a server 120, all sessions of the service (if any) must be moved to another server that is handling the same service. In the preferred embodiment, a "hot redirection" technique is used to transfer service sessions. The hot redirection technique works as follows. Initially, the Gateway 126 that is handling the logon session submits a serialization request to the server 120 that is handling the service session. The server 120 responds to the serialization request by returning an object that describes the internal state of the service session. This object is in the form of a byte stream which is normally meaningful only to a specific service. By way of example, the object for the hot redirection of a CHAT service session would normally indicate the conference name, the user name, the status of the user (e.g., a spectator, moderator, etc.), and the message number of the last CHAT message sent to the user in the CHAT conference. While the server is responding to the serialization request, the Gateway 126 buffers any service requests that are received from the client microcomputer 102. The Gateway 126 then forwards the internal state information and the buffered service requests (if any) to a new server 120 (using the load balancing procedure of FIG. 6 to select a new server), and the new server resumes processing of service requests where the former server left off.

Once all service sessions have been transferred in this manner, the service DLL can be dynamically unloaded. A new service DLL can then be dynamically loaded to activate a different service, or to activate an updated version of the removed service.

The above-described hot redirection technique improves service reliability from the perspective of the end user by allowing service sessions to continue when corresponding servers 120 are taken down for maintenance. It is contemplated that this technique will be combined with a fault detection mechanism to automatically transfer service sessions to different servers when signs of abnormal service behavior are present.

7. Client-Gateway Communications

Figure 10:
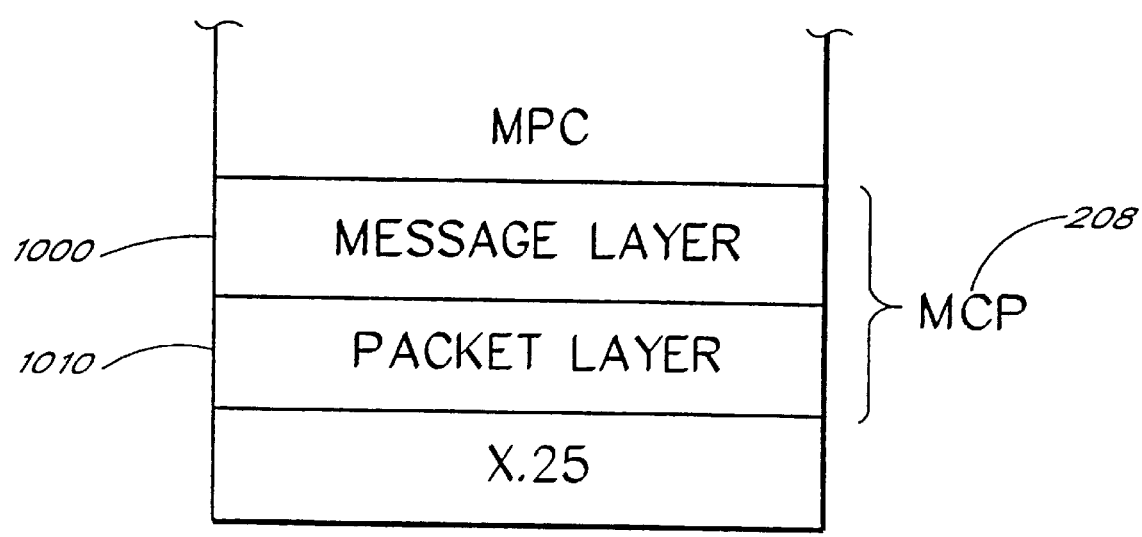
FIG. 10 illustrates the two component layers of a protocol layer that is used for communications between client and Gateway microcomputers.

Communications between client microcomputers 102 and Gateways 126 are handled primarily by the Microsoft Connection Protocol (MCP), which is embodied within the MCP layers 208 (FIGS. 2, 5A and 5B) in every client microcomputer 102 and every Gateway 126. With reference to FIG. 10, the MCP layer 208 comprises two protocol layers, a message layer 1000 and a packet layer 1010. The message layer 1000 tags each outgoing message with a message length, a message type, and a service session identifier. In accordance with one feature of the invention, the message layer 1000 additionally multiplexes message streams, each message stream associated with a different service session. In accordance with another feature of the invention, when two or more message streams are multiplexed, the message layer 1000 allocates WAN bandwidth to the message streams based on predetermined (or user-specified) service priority levels.

The message layer 1000 uses the packet layer 1010 to provide a reliable byte stream between the client microcomputer 102 and the Gateway 126. The packet layer 1010 handles error correction using CCITT CRC-32, and uses a sliding window protocol to handle flow control. To implement the sliding window protocol, each outbound packet contains an 8-bit packet sequence number which is incremented by the sender with successive packet transmissions. Each packet also contains the 8-bit packet sequence number of the first non-received packet (with erroneous packets treated as non-received packets), so that packets sent in one direction serve as acknowledgements for packets sent in the opposite direction. Special acknowledgement packets (i.e., packets that do not contain client-server message data) are transmitted after a timeout period if the receiver has no data to send. Sliding window protocols are well known in the art, and are described in Tannenbaum, *Computer Networks,* 2nd Ed., Prentice-Hall, Inc., 1989, pp. 223–239.

Figure 11A:
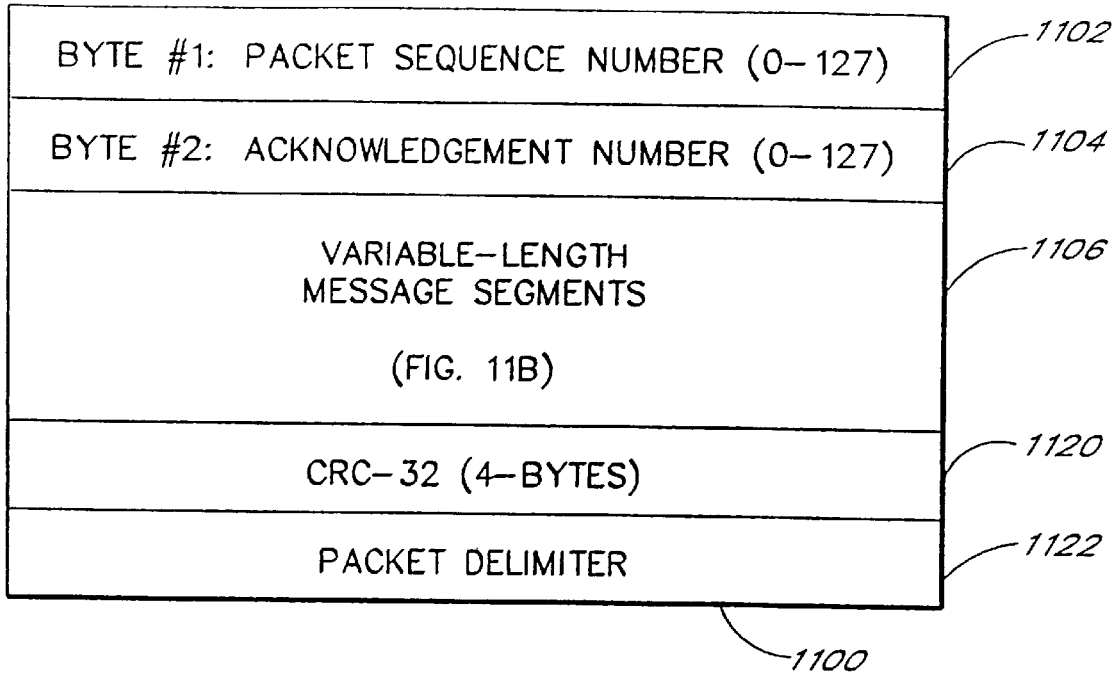
FIGS. 11A and 11B illustrate a preferred packet format used for data communications between client microcomputers and Gateway microcomputers over a wide area network.
Figure 11B:
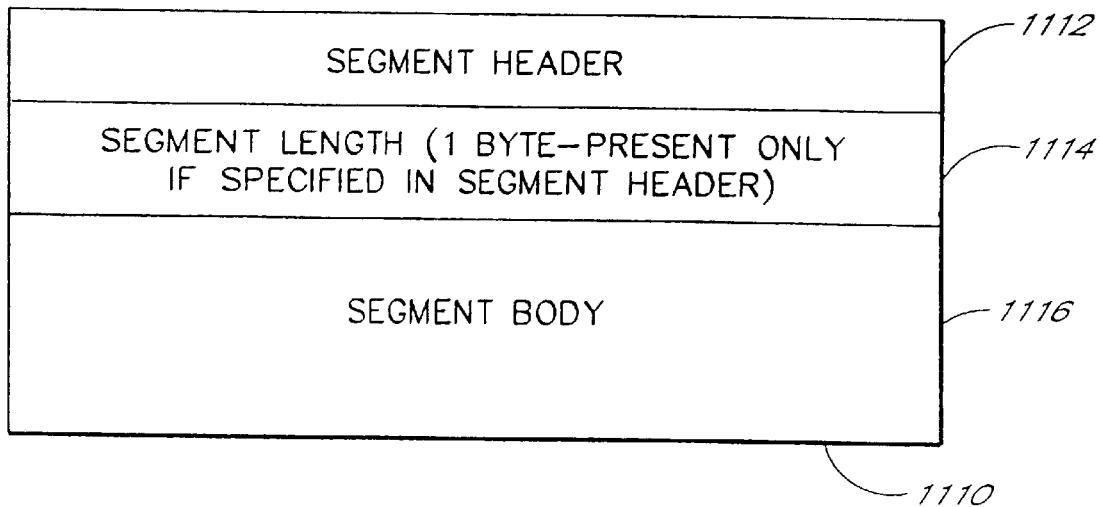

FIGS. 11A and 11B illustrate the preferred packet format used by the Microsoft Connection Protocol. Each packet 1100 has a length of either 256 bytes or 512 bytes, depending upon the identity of the telecommunications provider that provides the X.25 connection. Each packet 1100 includes a one-byte packet sequence number field 1102 followed by a one-byte acknowledgement number field 1104 (which indicates the sequence number of the first non-received packet). As indicated above, the packet sequence number and acknowledgement number are used to implement the sliding window protocol.

With the exception of special acknowledgement packets, each packet 1100 additionally includes one or more variable-length message segments 1106 (hereinafter "segments"). Segments are sub-units of messages, and are used by the MCP layer to multiplex message streams of different service sessions of a common end user. Messages are segmented on the originating side and reassembled at the receiving side. The first segment of a message specifies the length of the message. As further described below, the MCP layer allocates segments to service message streams in a round robin fashion, while varying the lengths of different segments in order to allocate different amounts of bandwidth to the different services.

With reference to FIG. 11B, which illustrates the format of a segment 1110 (many of which may be contained in the segment field 1106 of FIG. 11A), each segment 1110 includes a segment header 1112, an optional one-byte segment length field 1114, and a segment body 1116. The segment header 1112 includes a multiplexing channel number (not shown). Multiplexing channels are allocated by the MCP layer to different service sessions (on a per-message-transmission basis) to allow the concurrent transmission of messages associated with different service sessions. In the preferred embodiment, a maximum of 16 simultaneous multiplexing channels can exist per user connection. When this multiplexing limit is reached, new message transmission requests are postponed until other messages are finished being transmitted. The limit of 16 multiplexing channels thus limits only the number of concurrent message transmissions, and not the number of service sessions.

Multiplexing channels may vary in bandwidth from one another. The MCP layer varies channel bandwidth by assigning different segment lengths to different service sessions. Segment lengths are preferably assigned on the Gateway side. The segment length assigned to a given service session can be modified (under the control of the service applications) during the lifetime of the service session. Segment lengths are preferably assigned when a service session is first opened (i.e., when the first segment of a new message stream is transmitted).

With further reference to FIG. 11B, the segment header 1112 also includes three segment control bits (not shown). The first segment control bit is used to indicate whether or not the segment is the last segment of a message. The second segment control bit is used to indicate whether or not the segment extends to the end of the packet 1100. When the segment does not extend to the end of the packet 1100, the byte 1114 that follows the segment header 1112 will specify the number of bytes of message data contained within the segment body 1116. The third segment control bit is used to indicate whether or not the message is a control message (such as a "close" request). When this third control bit indicates a control message, the first byte of the message indicates the control type.

Referring again to FIG. 11A, each packet 1100 further contains a four-byte cyclical redundancy check (CRC) code 1120 (in accordance with CRC-32) to permit detection and correction of errors. Each packet 1100 ends with a packet delimiter 1122, such as an ASCII carriage return code.

Figure 12:
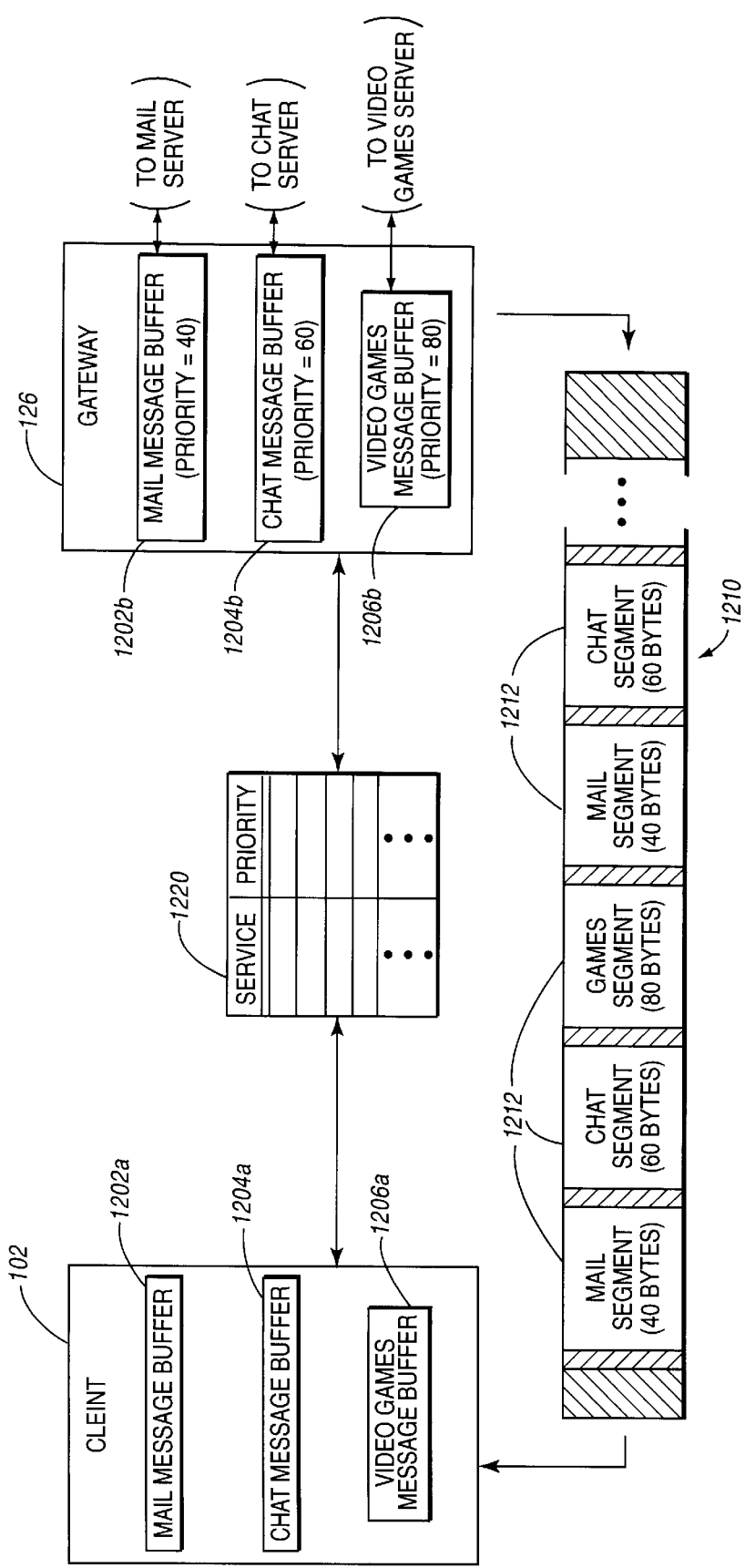
FIG. 12 illustrates a multiplexing technique for combining multiple client-server message streams within packets transmitted over the wide area network.

FIG. 12 illustrates, in example format, the preferred multiplexing and prioritization method of the present invention. A client microcomputer 102 is shown concurrently communicating with three different servers, a MAIL server, a CHAT server, and a VIDEO GAMES server (servers not shown). Within the client microcomputer 102, the MCP layer has allocated portions of RAM to the respective services to form a MAIL message buffer 1202a, a CHAT message buffer 1204a, and a VIDEO GAMES message buffer 1206a. Likewise, within the Gateway 126 to which the client microcomputer 102 is connected, the MCP layer has allocated portions of RAM to form corresponding MAIL, CHAT and VIDEO GAMES message buffers 1202b, 1204b and 1206b. Each buffer in FIG. 12 is associated with a particular service session, and can be thought of as including two separate buffers, a first buffer for holding outgoing messages and a second buffer for receiving incoming messages.

A packet 1210 being sent from the Gateway 126 to the client microcomputer 102 contains segments 1212 corresponding to the MAIL, CHAT and VIDEO GAMES services. Each segment 1212 contains a portion of an outgoing message stored in one of the buffers 1202b, 1204b, 1206b. The packet 1210 is generated by the MCP layer by extracting and multiplexing message data from the buffers 1202b, 1204b, 1206b in a round robin fashion. When the packet 1210 arrives at the client microcomputer 102, the MCP layer extracts and demultiplexes the segments, and stores the message data in the corresponding MAIL, CHAT and VIDEO GAMES buffers 1202a, 1204a, and 1206a. Messages sent from the client microcomputer 102 to the Gateway 126 are multiplexed, packetized, and demultiplexed in the same manner.

As recognized by those skilled in the art, different types of on-line services tend to have different throughput and/or latency demands. For example, an on-line interactive video games service will likely require a greater throughput for satisfactory operation than a mail service. Thus, with the multiplexing scheme of the present invention, it is desirable to implement a corresponding service priority scheme, whereby different services are allocated different amounts of the available WAN bandwidth. This is preferably accomplished by assigning segment lengths to different on-line services based on predetermined entries stored within a service priority table 1220. The service priority table 1220 contains priority levels (in the form of maximum segment lengths) for each on-line service (or class of on-line service), and is accessed by the MCP layer whenever a new service is opened by the user. The service priority table may additionally include minimum throughput requirements for certain services. For example, for an embodiment of the CHAT service that permits voice communications, the table 1220 could indicate a minimum throughput requirement of 7 kbps (to ensure voice reproduction of a predetermined quality), and request to open the service could be failed when this amount of bandwidth is not available.

In the example shown in FIG. 12, the MCP layer has allocated segment lengths of 40 bytes, 60 bytes and 80 bytes, respectively, to the MAIL, CHAT and VIDEO GAMES services. Thus, the MAIL service has been allocated half the bandwidth of the VIDEO GAMES service, and two-thirds the bandwidth of the CHAT service.

The service priority table 1220 may reside within either the client microcomputer 102, the Gateway 126, or both. Alternatively, the throughput priorities could be provided by the service applications, eliminating the need for the table 1220. In the preferred embodiment, the throughput priorities indicated by the table 1220 cannot be overridden by end users. In other embodiments, client applications may be written to allow end users to override the predetermined throughput priorities.

Because throughput demands for client-to-server data transfers of a service may differ significantly from the throughput demands for server-to-client data transfers (for the same service), it may be desirable to use a first set of bandwidth allocations for client-to-Gateway message traffic, and second set of bandwidth allocations for Gateway-to-client message traffic. This may be accomplished by maintaining two priority levels for each service, one for client-to-server messages, and another for server-to-client messages.

Although the above-described multiplexing and bandwidth allocation schemes are described in the context of packets, it will be recognized that the packetization of message segments is not essential. For example, in embodiments which use TCP/IP for client-Gateway communications, the variable-length segments are simply multiplexed within the outgoing byte stream, and no packetization by the client microcomputer 102 or the Gateway 126 is necessary.

8. Arbiter

As indicated above, certain types of services make use of the Arbiter service to replicate update transactions. In the preferred embodiment, the Arbiter is implemented by dedicated Arbiter microcomputers 128 (shown in FIGS. 1 and 3) that are assigned to particular service groups. Advantageously, the Arbiter software is service-application-dependent, and thus does not have to be customized for each service. Service applications that require the Arbiter are simply written to make use of the services provided by the Arbiter, as further described below.

The Arbiter performs data set replication as follows. Whenever a server 120 of a service group receives a request (typically from a client microcomputer 102) that requires an update to the service's content data, the server generates and sends an update transaction to the service group's Arbiter microcomputer 128 (assuming the service group uses the Arbiter service) without processing the transaction. This transaction specifies the data entity (such as a BBS file) to be updated, and the specific update to be made to the data entity. The Arbiter microcomputer 128 records each update transaction it receives in its transaction log, and dispatches each update transaction to every server 120 in the service group (by issuing remote procedure calls to the servers 120), including the server 120 that generated the transaction. (Each Arbiter microcomputer 128 keeps track of the servers 120 within its respective service group by monitoring the global registry 145, which includes a mapping of servers to service groups).

The servers 120 that receive the update transaction from the Arbiter respond by processing the update transaction, and by returning a status code. The update transactions are dispatched to the servers 120 in a serialized order (preferably on a first-submitted-first-dispatched basis), so that all servers of the service group process the update transactions in the same order.

Each time an update transaction is dispatched by the Arbiter, the Arbiter monitors the outcome (typically success or failure) of the transaction on each server 120 by checking the status codes returned by the servers 120. When one server 120 of the service group processes the dispatched transaction differently than the other servers, the Arbiter takes that server off-line. More generally, if a minority number of servers 120 of the service group report a different outcome than the other servers, the minority servers are treated as being "wrong" and are taken off-line. The Arbiter service thereby ensures that all operational servers 120 within the service group contain consistent service content data.

By way of example, suppose that the BBS server 120f (FIG. 3) receives a user service request that will cause a BBS message to be added to a specified folder, and that the BBS server 120g receives a service request that will cause another BBS folder to be deleted. Since both of these requests require updates to BBS content data, the servers 120f and 120g send update transactions to the BBS Arbiter microcomputer 128 (without updating their own copies of the BBS content data). (Note that it is the responsibility of the service applications to detect and forward update transactions.) The BBS Arbiter microcomputer 128 (hereinafter "BBS Arbiter 128") records these transactions in its transaction log 306. One or more dispatcher threads (not shown) running on the BBS Arbiter 128 read the update transactions from the transaction log, and dispatch the update transactions (in the order received) to each of the BBS servers 120e–g.

Upon processing each update transaction, the servers 120e–102g report back to the BBS Arbiter 128 on the success or failure of the transaction by returning a status code. To provide a specific example, if the servers 120e and 120f report successful completion of the update transaction and the server 120g reports a failure, the "odd-ball" server 120g is taken off-line by the BBS Arbiter 128. If, on the other hand, the servers 120e and 120f report a failure of the transaction and the server 120g reports a success, the server 120g is again taken off-line (since it represents the minority outcome), even though the server 120g reported a successful completion of the transaction. Whenever a server 120 is taken off-line, a message is sent to a system console (not shown) to inform a human operator of the problem.

For each update transaction, the Arbiter microcomputer 128 records in the transaction log the following information: the time of the transaction, a transaction ID (TRID), the originator of the transaction, the data set (or data sets) affected by the transaction, the contents of the transaction (contents dependent upon the particular service), the transaction results received from the servers 120, and the status of the transaction (pending, success, failure, etc.). The Arbiter transaction log is stored in non-volatile memory, and continues to grow in size until trimmed. Transaction logs are trimmed according to trimming policies which are specified in the global registry 145.

Advantageously, the transaction log of an Arbiter microcomputer 128 typically contains all of the information needed to automatically bring up a new server within the corresponding service group. The new server 120 being brought up may, for example, be a server that was taken off-line (with respect to the service group) for maintenance, or a server that is being reallocated to the service group from a lightly loaded service group, or a server that is being added to the host data center 104.

When a new server is added to a service group (i.e., when the appropriate service DLL or DLLs are initially loaded on the new server), the Arbiter issues the update transactions stored in the corresponding transaction log to the new server 120 while monitoring the outcome of each transaction. The transactions are submitted to the new server 120 in the same order as previously dispatched to the other servers 120 in the service group, so that the new server is brought to the same state as the existing servers. If the transaction log does not go back far enough to bring up the new server 120, a message is sent to the system console, and a backup of the service group's transaction log is used to supplement the current transaction log.

During this process of synchronizing or "rolling forward" the new server 120, the service application running on the server remains in an "invalid" state, and no service requests from client applications are taken. Once all of the transactions recorded within the transaction log have been processed by the new server 120, the state of the new server is set by the Arbiter to "active," and the new server begins receiving service requests.

Although the Arbiter service is preferably implemented on service-specific Arbiter microcomputers which run the Arbiter software, it will be recognized that the functionality of the Arbiters could be implemented elsewhere within in the host data center 104. For example, Arbiter functionality could be implemented by a server 120 of a service group. It will also be recognized that two or more service groups could share the same Arbiter microcomputers 128, and that multiple Arbiter microcomputers 128 could be assigned to the same service group to handle different types of transactions.

A preferred implementation of the Arbiter service is described in further detail in a concurrently filed patent application having the title TRANSACTION REPLICATION SYSTEM AND METHOD FOR SUPPORTING REPLICATED TRANSACTION-BASED SERVICES, which is incorporated herein by reference.

9. Dynamic Allocation of Servers to Service Groups

Loads placed on particular services (or equivalently, particular service groups) may fluctuate relative to one another on a daily basis due to fluctuations in usage of different services. Usage of a STOCK QUOTE service, for example, may peek during regular business hours, while usage of a CHAT service may peak at night or on weekends. To accommodate for such fluctuations in service usage levels, the on-line services network 100 allocates servers 120 to service groups based on service loads.

In a preferred embodiment, the on-line services network 100 maintains a pool of unused servers 120. Servers 120 are taken from the pool and allocated to service groups when high service group loads (i.e., high service loads) are detected, and are added to the pool when low service group loads are detected. Servers may additionally or alternatively be reallocated from service group to service group without being added to the pool. Because overall usage levels of on-line services networks typically fluctuate with time (with, for example, peak usage occurring during daytime and early evening hours, and lighter usage levels occurring during early morning hours), the size of the pool will typically fluctuate significantly on a daily basis.

The framework for being able to dynamically allocate servers 120 to service groups based on service group loads is set by the service map, dynamic DLL loading/unloading, hot redirection, and Arbiter features discussed above. Specifically, the service map 136 indicates the loads of all operational servers 120, and thus enables the loads of the various service groups to be determined; dynamic loading and unloading of service DLLs enables different service applications to be activated and deactivated on different servers, and thus enables servers 120 to be automatically transferred from service group to service group (or between a pool of unused servers and a service group); hot redirection enables a service session to be transferred from one server to another, so that a server can be removed from a service group without prematurely terminating a service session; and the Arbiter 128 enables new servers 120 to be "rolled forward" to the same state as the other servers of a service group (for services that use dynamic, replicated data sets). Thus, with the addition of a mechanism for monitoring service group loads, servers 120 can be dynamically allocated to service groups to achieve a balanced allocation of processing resources to services.

In one embodiment of the on-line services network 100, service group loads are monitored by a system operator who decides when and how to allocate servers 120 to service groups. In another embodiment, the process of allocating servers 120 to service groups is completely automated, with a load monitoring program (which runs, for example, on one of the administrative servers 134) deciding when and how to reallocate servers. A load monitoring program of this type is illustrated in FIG. 13.

Figure 13:
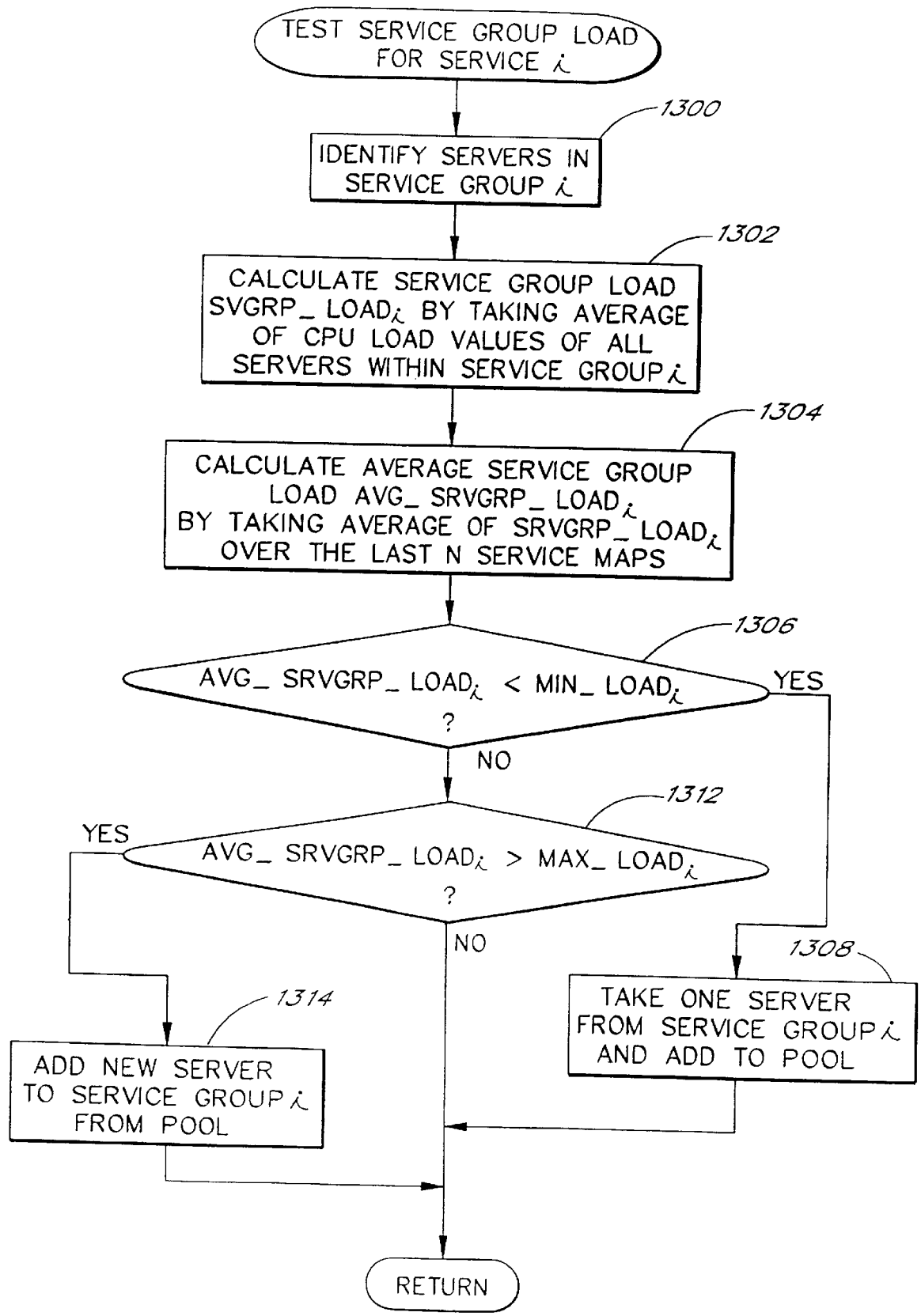
FIG. 13 is a flow chart illustrating a technique for monitoring service group loads.

FIG. 13 is a high level flow chart of a preferred routine for monitoring the load on a particular service, service i, and for determining whether a server 120 should be added to or extracted from the corresponding service group, service group i. The routine is preferably run continuously (on a service-by-service basis) on a dedicated administrative server 134 that receives the periodically broadcasted service map 136. With reference to blocks 1300 and 1302, the service map 136 is initially accessed to identify the servers 120 currently allocated to the service group, and to read the CPU LOAD values of each identified server. These CPU LOAD values are then averaged to obtain the load of the service group, SRVGRP_LOAD. With reference to block 1304, the SRVGRP_LOAD values calculated over the last N service maps are then averaged to obtain the average load of the service group, AVG_SRVGRP_LOAD, over a predetermined period of time (defined by N). The effect of this step is to filter out short-term fluctuations in the load of the service group, so that servers 120 will not unnecessarily be taken from or added to the service group. The variable N can be set to different values for different services.

With reference to blocks 1306 and 1308, the average load AVG_SRVGRP_LOAD is then compared to a predetermined minimum, MIN_LOAD, to determine whether a server 120 should be removed from the service group. If the average load is less than the predetermined minimum, a server 120 will be extracted from the service group (assuming there are currently at least two servers in the service group) and added to the pool of unused servers. With reference to blocks 1312 and 1314, the average load is also compared to a predetermined maximum, MAX_LOAD, to determine whether or not to add a server 120 to the service group. If the average load is greater than the predetermined maximum, a server 120 will be added to the service group from the pool (assuming there is currently at least one server in the pool). The predetermined MIN_LOAD and MAX_LOAD values can be set by a system operator, and can be set to different values for different services. An appropriate algorithm could be used to adjust the MIN_LOAD and MAX_LOAD values for a service based on the number of servers 120 currently allocated to the service group.

As indicated above, whenever a server 120 is transferred to or from a service group, the change is reflected in the service map 136, causing the Gateways 126 to route service requests in accordance with the change. For example, when a server 120 is added to a MAIL service group, the server will inform the service map dispatcher 144 of its change in status (by transmitting its local map 140 to the service map dispatcher 144), and the service map dispatcher 144 will include the status change (along with the CPU LOAD and CPU INDEX values for the server) in the next service map 136. Once the updated service map 136 has been broadcasted to the Gateways 126, the Gateways will route "open" requests to the newly added server in accordance with an appropriate load balancing method (as described above). Likewise, when a server 120 is extracted from a service group and added to the pool of unused servers, the server's local map 140 will not appear in the next service map 136, and the Gateways 126 will stop routing service requests to the removed server.

10. Scalability

An important aspect of the on-line services network 100 described above is its ability to be scaled in capacity without having to change the existing system and application software, and without having to reconfigure existing network components. In accordance with the architecture of the system, new service applications can (and normally will) be written to interact with existing Gateway 126, Arbiter 128 and service map dispatcher 144 software components so that new services can be added without changing these components. By way of example, because the Arbiter 128 is implemented as a generic (i.e., service-independent) transaction replication service, new service applications can be written to make use of the services provided by the Arbiter 128, and no changes to the existing Arbiter software will be necessitated by the addition of such service applications.

Scaling of system capacity is also facilitated by the service map feature of the architecture. For example, new servers 120 and/or new service applications can be added to the system without having to manually update service request routing tables or Arbiter tables.

Scalability is also provided by the ability to allocate a variable number of replicated servers to a given service; increased demand for a service can be accommodated for by simply allocating additional servers to the popular service. Because the replicated servers of a service group handle service requests independently from one another, no performance bottlenecks exist; thus, increases in service loads can be accommodated for (by the addition of servers) without any significant degradation in performance.

Although this invention has been described in terms of certain preferred embodiments, other embodiments that are apparent to those or ordinary skill in the art are also within the scope of this invention. Further, although the invention has been described in the context of on-line services networks, it will be recognized that certain aspects of the invention are applicable to other types of computer networks. By way of specific example, the dynamic load balancing methods described herein could be used to select between servers of a distributed data base system. Accordingly, the scope of the present invention is intended to be defined only by reference to the appended claims.

What is claimed is:

1. A data center for providing on-line service to end users who connect to the data center from client computers that run client applications, comprising:

a plurality of application servers interconnected by a local area network, each application server running at least one service application that implements an on-line service, different groups of said application servers running different service applications to provide different on-line services, application servers which run like service applications forming service groups; and a plurality of gateway computers connected to said application servers by said local area network and connected to the client computers by a wide area network, each gateway computer locally storing a respective copy of a service map that includes a mapping of application servers to service groups, said service map automatically updated by said plurality of application servers, each gateway computer programmed to receive service requests from client computers and to route said service requests to application servers running corresponding service applications, the gateway computers further programmed to establish and maintain bi-directional data connections between the client computers and said application servers over the local area network based on entries within the service map, the data connections corresponding to user service sessions.

2. The data center according to claim 1, each gateway computer further programmed to, upon receiving a service request from a client computer to open a user-specified service, doing each of:

(a) identifying all application servers that fall within a service group which corresponds to said user-specified service, (b) determining respective processing loads for each application server identified in step (a), and (c) based on processing loads determined in step (b), selecting an application server from said service group to process said request to open said user-specified service.

3. The data center according to claim 2, wherein step (b) comprises accessing said service map, said service map indicating processing loads for substantially all of said application servers, including application servers of multiple different service groups, said service map automatically updated by said application servers to reflect changes in processing loads.

4. The data center according to claim 2, wherein step (c) comprises selecting an application server with a greatest available CPU processing power.

5. The data center according to claim 2, wherein step (c) comprises selecting an application server such that a probability of selection is proportional to an available CPU processing power.

6. The data center according to claim 1, each gateway computer further programmed to, upon receiving a service request from a client computer to open a user-specified service, doing each of:

(a) calling a service-specific locator to identify a unique one of said application servers that corresponds to said service request, and (b) routing said service request to the application server identified in step (a).

7. The data center according to claim 6, wherein step (a) comprises using a user identifier to identify one of a plurality of MAIL servers.

8. The data center according to claim 6, wherein step (a) comprises using a user identifier and a service identifier to identify said unique application server.

9. The data center according to claim 6, wherein step (a) comprises using a conference locator to identify one of a plurality of CHAT servers.

10. The data center according to claim 9, wherein step (a) comprises identifying a CHAT server which is assigned to a user-specified CHAT conference.

11. The data center according to claim 1, further comprising a service map dispatcher connected to said local area network, said service map dispatcher programmed to receive information from said application servers and to generate said service map therefrom, said service map dispatcher further programmed to periodically broadcast an updated version of said service map to said gateway computers.

12. The data center according to claim 11, wherein said service map contains a mapping of application servers to service applications, said service map thereby enabling said gateway computers to identify application servers to handle specific service requests.

13. The data center according to claim 11, wherein said service map contains, for each of said application servers, a client count value that indicates a current number of service sessions.

14. The data center according to claim 11, wherein said service map contains, for each of said application servers, a processing load value which indicates a current application server processing load.

15. The data center according to claim 14, wherein said service map additionally contains, for each of said application servers, a CPU index value which indicates an overall application server processing power.

16. The data center according to claim 1, each gateway computer further programmed to receive a multiplexed data stream from a client computer, said multiplexed data stream containing alternating portions of different messages, at least two of said different messages addressed to different services, each gateway computer further programmed to demultiplex said multiplexed data stream to reconstruct said messages, and to route reconstructed messages to corresponding application servers, said gateway computers thereby permitting a client computer to concurrently communicate with multiple application servers so that an end user can simultaneously access multiple on-line services via a single gateway computer.

17. The data center according to claim 16, wherein said portions of different messages are varied in size so as to allocate different amounts of wide area network bandwidth to different services.

18. The data center according to claim 1, each gateway computer further programmed to receive multiple data streams from said application servers and to multiplex said data streams for transmission to a client computer, each of said data streams generated by a different application server and corresponding to a different on-line service, said gateways thereby allowing an end user to concurrently receive data from multiple on-line services.

19. The data center according to claim 18, wherein each gateway multiplexes said data streams by combining variable-length portions of said data streams, lengths of said variable-length portions being varied from on-line service to on-line service to allocate different amounts of bandwidth to different services.

20. The data center according to claim 1, further comprising a load monitoring computer programmed to monitor loads of said service groups, and to add an application server to a service group when a load on said service group exceeds a predetermined threshold.

21. The data center according to claim 1, wherein at least one of said application servers comprises a hard drive having stored thereon a plurality of dynamically loadable service modules, each dynamically loadable service module comprising executable code of a respective service application, said dynamically loadable service modules enabling an application server to be automatically allocated from one service to another, the at least one application server further including code for transferring a user service session to another application server when the application server is reallocated.

22. The data center according to claim 21, wherein the at least one application server runs a process that dynamically loads and unloads different executable service modules to activate and deactivate different service applications.

23. The data center according to claim 22, wherein said process is a multi-threaded process.

24. The data center according to claim 1, wherein each application server of at least one service group locally stores a replicated copy of on-line service data, said on-line service data provided to end users of an on-line service that corresponds to said service group.

25. The data center according to claim 1, further comprising a client microcomputer configured to access said on-line services, the client microcomputer comprising:

a plurality of client applications, each client application configured to communicate with a corresponding server application of the data center to thereby implement an on-line service, each client application generating an outgoing data stream to a corresponding server application and receiving an incoming data stream from said corresponding server applications; and a communications program configured to multiplex multiple of said outgoing data streams for transmission to the data center, and configured to separate multiplexed incoming data streams and route said incoming data streams to corresponding of said client applications, said communications program thereby enabling a user of the data center to concurrently access multiple on-line services.

26. The client microcomputer according to claim 25, said communications program further configured to multiplex said outgoing data streams by combining variable-length data segments from alternating of said outgoing data streams, lengths of said variable-length segments assigned by said communications program according to throughput priorities of corresponding on-line services.

27. The client microcomputer according to claim 25, said communications program further configured to combine said outgoing data streams within packets, each packet containing segments from alternating of said outgoing data streams.

28. The client microcomputer according to claim 27, wherein said segments are variable-length segments, and wherein lengths of said segments are assigned on a per-client application basis.

29. The client microcomputer according to claim 27, said communications program further configured to implement a sliding window flow control protocol.

30. The client microcomputer according to claim 27, said communications program further configured to implement CCITT CRC-32 error correction.

31. In a computer network which comprises a gateway computer that connects a wide area network to a local area network, a method of processing service requests from users so as to balance a processing load among application servers of the network, the application servers interconnected by the local area network, the method comprising the steps of:

receiving a service request at a host data center, said service request transmitted from client computer to said host data center over said wide area network, said service request corresponding to a service;

identifying a group of application servers that are assigned to said service, said step of identifying comprising accessing a service map stored by said gateway computer, said service map automatically updated by said application servers;

determining processing loads of each application server in said group;

based on said processing loads, selecting an application server from said group to process said service request; and routing said service request to a selected application server.

32. The method according to claim 31, wherein said step of selecting comprises calculating an available CPU processing power for each application server in said group.

33. The method according to claim 32, wherein said step of selecting further comprises selecting an application server having the greatest available CPU processing power.

34. The method according to claim 32, wherein a probability of selection of an application server is proportional to the available CPU processing power for said application server.

35. The method according to claim 32, wherein said available CPU processing power is calculated as a function of a CPU load value and a CPU index value for each respective application server of said group, said CPU load values indicating loads on respective application servers caused by service requests, said CPU index values indicating overall processing powers of respective application servers.

36. The method according to claim 31, wherein said step of determining comprises accessing said service map, said service map indicating processing loads for said application servers.

37. The method according to claim 36, wherein said service map is automatically updated on a substantially periodic basis to reflect changes in application server loads.

38. The method according to claim 36, wherein said service map is automatically updated on an average of at least once per minute to reflect changes in application server loads.

39. The method according to claim 37, wherein said service map is broadcasted to a plurality of service request routers of said host data center on a substantially periodic basis.

40. The method according to claim 31, wherein said service map includes a mapping of application servers to services for substantially every application server of said host data center.

41. The method according to claim 31, wherein said step of receiving, identifying, determining and selecting are performed by said gateway computer.

42. The method according to claim 31, wherein said service request comprises a request to open service.

43. The method of claim 31, further comprising the steps of:
generating a plurality of data streams between said client computer and said gateway computer, each data stream corresponding to a respective service session, each service session handled by a different application server; and
multiplexing said data stream for concurrent transmission over said wide area network;
the method thereby enabling concurrent use of multiple services by a single user.

44. The method according to claim 43, further comprising, at said gateway computer, doing each of:
demultiplexing multiplexed data streams generated by said client computer, and
forwarding demultiplexed data streams to corresponding application servers.

45. The method according to claim 43, wherein said step of multiplexing comprises allocating different quantities of wide area network bandwidth to different data streams of said plurality of data streams to thereby accommodate for differing throughput priorities of different services.

46. The method according to claim 43, wherein said step of multiplexing comprises generating a packet for transmission over said wide area network, said packet containing segments of each data stream of said plurality of data streams.

47. The method according to claim 46, wherein said segments are variable length segments, and wherein lengths of said segments are varied from data stream to data stream in order to allocate differing quantities of available wide area network bandwidth to different services.

48. The method according to claim 47, wherein said lengths are varied in proportion to predetermined throughput priorities of corresponding services.

49. The method according to claim 47, wherein said lengths are varied in proportion to user-specified throughput priorities of corresponding services.

50. A gateway computer, comprising:
a first network interface for communicating with client computers;
second network interface for communicating with a plurality of servers;
a memory, said memory containing load data for said plurality of servers, said load data updated periodically such that said load data indicates current loads for said plurality of servers, said load data indicating, for each server of said plurality of servers, an available processing power for processing requests from client computers; and
a CPU, said CPU programmed to each of:
(a) receive a request from a client computer,
(b) in response to said request, access said load data to identify a server of said plurality of servers that is lightly load, and
(c) route said request to said server identified in step (b).

51. The gateway computer according to claim 50, wherein said first network interface is configured for communications over a wide area network, and wherein said second network interface is configured for communications over a local area network.

52. The gateway computer according to claim 50, wherein said memory further comprises application mapping data, said application mapping data identifying server applications running on different servers of said plurality of servers.

53. The gateway computer according to claim 52, said CPU further programmed to, upon receiving a request which identifies an application, accessing said application mapping data to identify a group of servers of said plurality of servers that is running said application.

54. The gateway computer according to claim 50, said CPU further programmed to:
(d) receive respective data streams from at least two servers of said plurality of servers, and
(e) multiplex said data streams for transmission to said client computer.

55. A method of disseminating load data of a plurality of servers to a plurality of routing computers that route client requests to the servers based on the load data received from a dispatcher entity, the servers, the routing computers and the dispatcher entity interconnected by a local area network, the method comprising the steps of:
(a) at each server of the plurality of servers, automatically determining a current load on the respective server, and automatically transmitting load data that reflects the current load to the dispatcher entity of the local area network; and
(b) at the dispatcher entity, automatically compiling the load data received from each of the plurality of servers into a map, and broadcasting the map on the local area network to allow the routing computers to obtain the load data of the plurality of servers.

56. The method of claim 55, wherein step (a) comprises determining an available processing power of each server for handling client requests.

57. The method of claim 55, wherein step (a) comprises, at each server of the plurality of servers, sending service allocation data to the dispatcher entity, the service allocation data indicating at least one service to which the respective server is currently allocated, and wherein step (b) comprises broadcasting the allocation data of the plurality of servers from the dispatcher entity on the local area network.

58. A data center for providing on-line services to end users who connect to the data center from client computers that run client applications, comprising:
a plurality of application servers interconnected by a local area network, each application server running at least one service application that implements an on-line service, different groups of said application servers running different service applications to provide different on-line services, application servers which run like service applications forming service groups; and a plurality of gateway computers connected to said application servers by said local area network and connected to the client computers by a wide area network, each gateway computer programmed to receive service requests from client computers and to route said service requests to application servers running corresponding service applications, the gateway computers further programmed to establish and maintain bi-directional data connections between the client computers and said application servers over the local area network based on entries within the service map, the data connections corresponding to user service sessions, each gateway computer further programmed to, upon a service request from a client computer to open a user-specified service, doing each of:

(a) identifying all application servers that fall within a service group which correspond to said user-specified service, (b) determining respective processing loads for each application server identified in step (a), the step of determining comprising accessing a service map, said service map indicating processing loads for substantially all of said application servers, including application servers of multiple different service groups, said service map automatically updated by said application servers to reflect changes in processing loads, and (c) based on processing loads determined in step (b), selecting an application server from said service group to process said request to open said user-specified service.

59. The method of claim 55, wherein steps (a) and (b) are performed periodically.

\* \* \* \* \*

UNITED STATES PATENT AND TRADEMARK OFFICE
CERTIFICATE OF CORRECTION

PATENT NO. : 5,774,668
DATED : June 30, 1998
INVENTOR(S) : Choquier et al.

It is certified that error appears in the above-identified patent and that said Letters Patent is hereby corrected as shown below:

In Column 12, line 33: "Requests" should begin a new paragraph.

IN THE CLAIMS:

In Claim 50, Column 29, line 63: "second" should read --a second--.

Signed and Sealed this

Twenty-fourth Day of August, 1999

*Attest:*

Q. TODD DICKINSON

*Attesting Officer*       *Acting Commissioner of Patents and Trademarks*